US009787901B2

(12) United States Patent
Im et al.

(10) Patent No.: US 9,787,901 B2
(45) Date of Patent: Oct. 10, 2017

(54) MOBILE TERMINAL AND CONTROLLING METHOD THEREOF

(71) Applicant: LG ELECTRONICS INC., Seoul (KR)

(72) Inventors: Soungmin Im, Seoul (KR); Sooyon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/997,339

(22) Filed: Jan. 15, 2016

(65) Prior Publication Data

US 2017/0118409 A1    Apr. 27, 2017

(30) Foreign Application Priority Data

Oct. 23, 2015    (KR) .................. 10-2015-0148159

(51) Int. Cl.
*H04N 5/232*    (2006.01)
*H04N 5/355*    (2011.01)
*H04N 5/765*    (2006.01)

(52) U.S. Cl.
CPC ..... *H04N 5/23267* (2013.01); *H04N 5/23216* (2013.01); *H04N 5/23258* (2013.01);
(Continued)

(58) Field of Classification Search
CPC .......... H04N 5/23267; H04N 5/23216; H04N 5/23293; H04N 5/23258; H04N 5/765; H04N 5/3559

See application file for complete search history.

(56) References Cited

U.S. PATENT DOCUMENTS

2002/0122133 A1\* 9/2002 Ejima ............... H04N 5/23248
                                                                 348/362
2005/0179788 A1\* 8/2005 Okada .................... H04N 9/045
                                                                 348/222.1
(Continued)

FOREIGN PATENT DOCUMENTS

JP    2009077237    4/2009
JP    2009111596    5/2009

OTHER PUBLICATIONS

PCT International Application No. PCT/KR2016/003212, Written Opinion of the International Searching Authority dated Aug. 30, 2016, 14 pages.

*Primary Examiner* — Hung Lam
(74) *Attorney, Agent, or Firm* — Lee, Hong, Degerman, Kang & Waimey

(57) ABSTRACT

A mobile terminal and controlling method thereof are disclosed, by which a stabilization correction or a preset correction is performed depending on whether a destabilization is recognized from at least one object contained in an image. The present invention includes a display, and a controller operably coupled to the display and configured to cause the display to display a first image, cause the display to display a second image when destabilization of at least one object included in the first image is detected, the second image being an image of which destabilization correction is performed on the at least one object, and cause the display to display a third image when no destabilization of the at least one object is detected in the first image, the third image being an image of which preset correction is performed on the first image.

20 Claims, 32 Drawing Sheets

< 2001 >        < 2002 >

(52) U.S. Cl.
CPC ....... *H04N 5/23293* (2013.01); *H04N 5/3559* (2013.01); *H04N 5/765* (2013.01)

(56) References Cited

U.S. PATENT DOCUMENTS

| | | | |
|---|---|---|---|
| 2009/0086174 A1* | 4/2009 | Fukumoto | G03B 27/68 355/29 |
| 2009/0115859 A1* | 5/2009 | Lee | H04N 5/23248 348/208.4 |
| 2012/0229661 A1* | 9/2012 | Sekiguchi | A61B 5/0205 348/208.4 |
| 2014/0049658 A1 | 2/2014 | Yamazaki | |
| 2014/0125826 A1 | 5/2014 | Miyasako | |

\* cited by examiner

FIG. 14
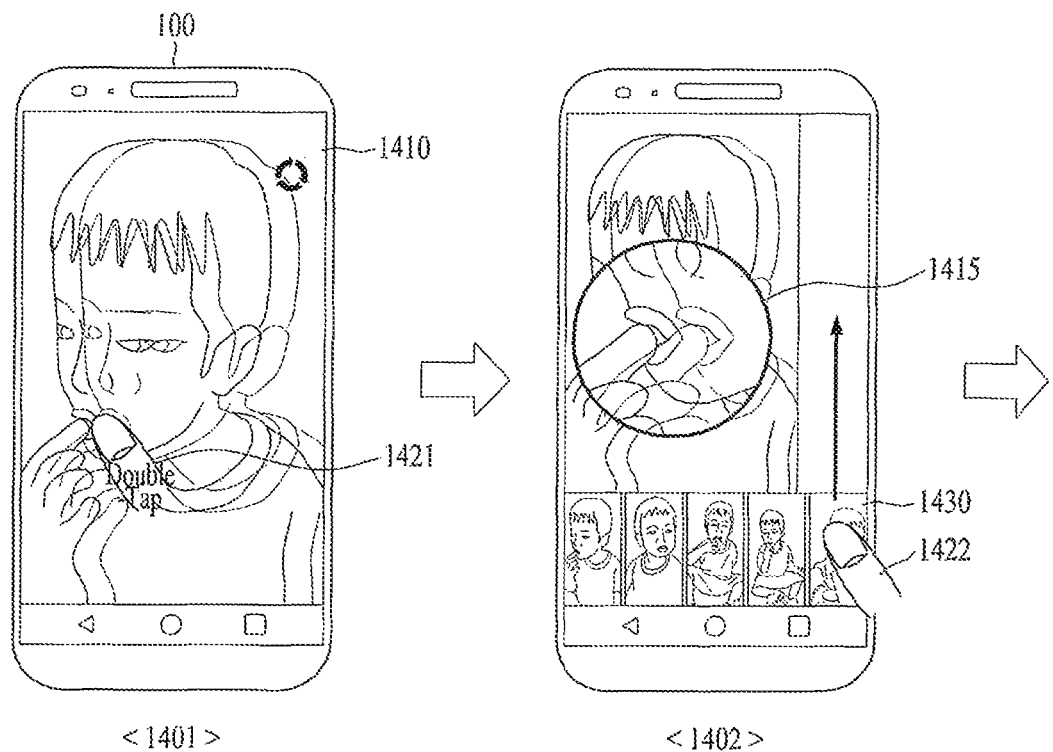
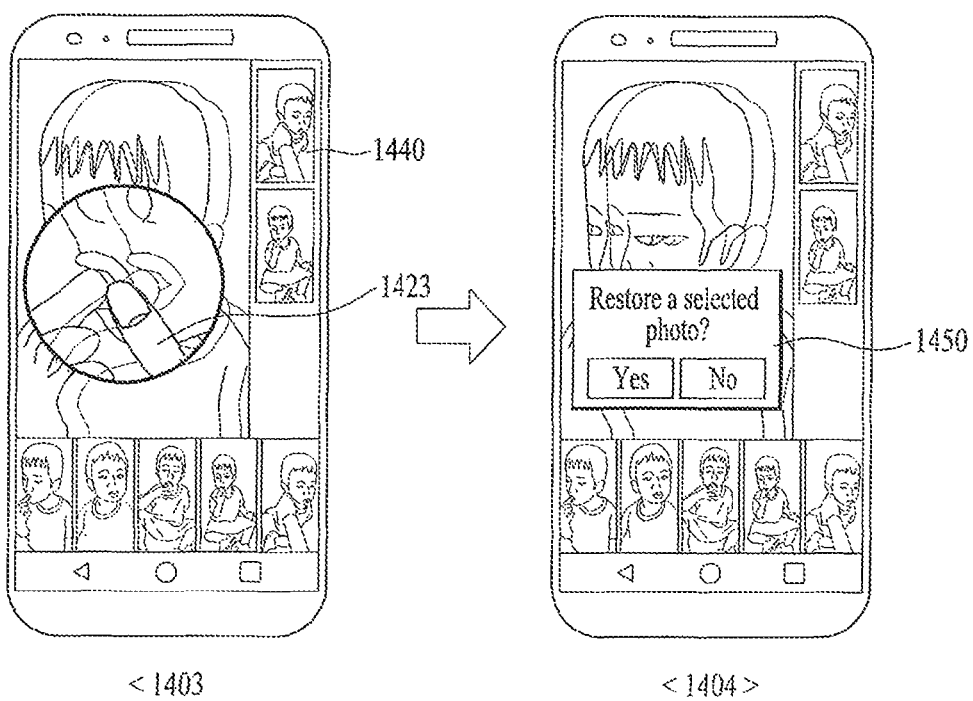

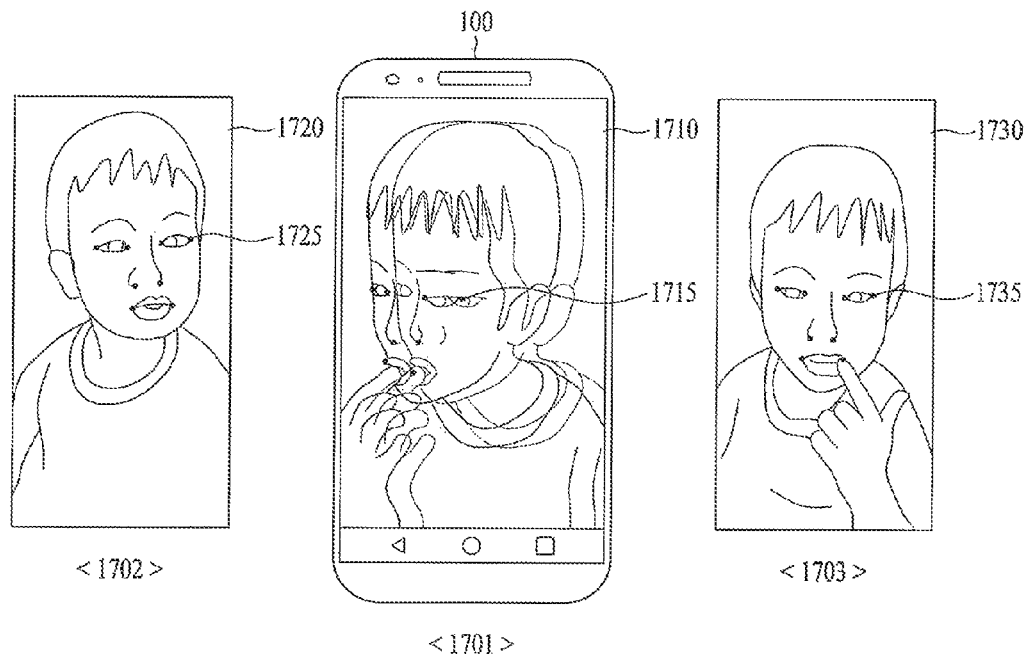
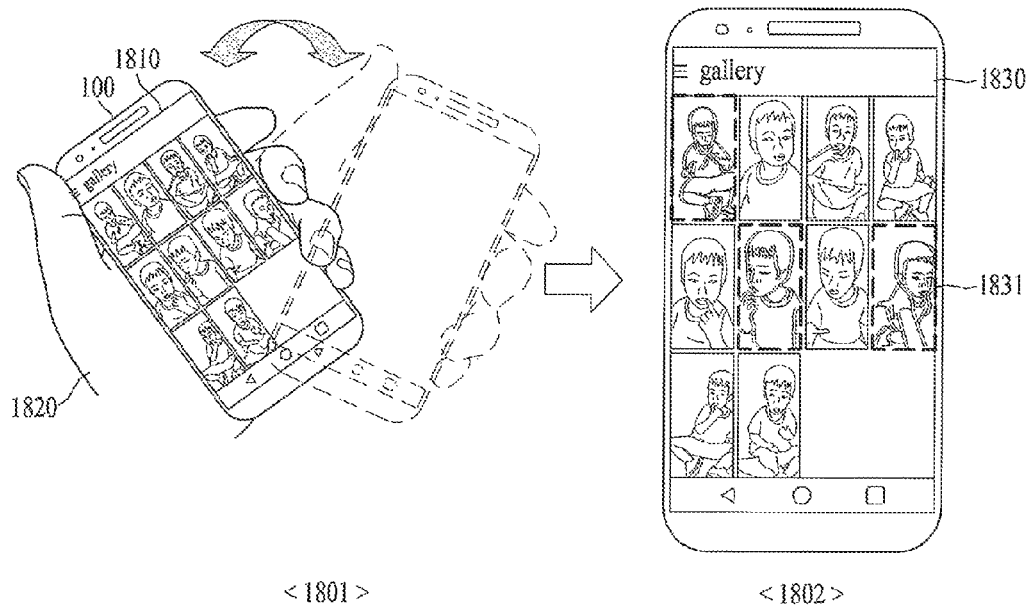

<2001>  <2002>

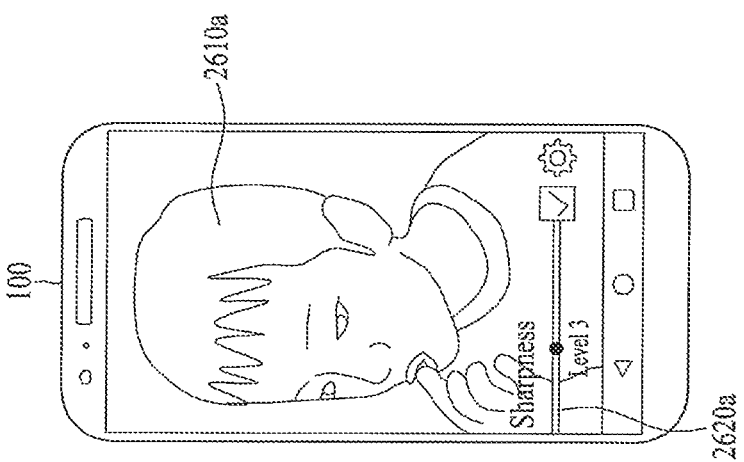
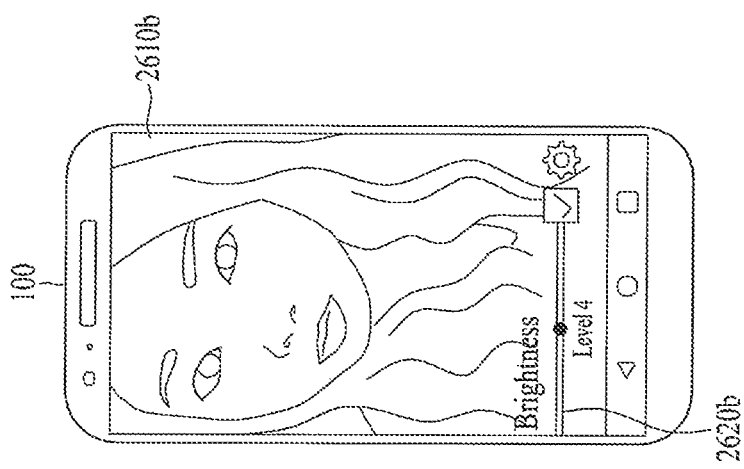
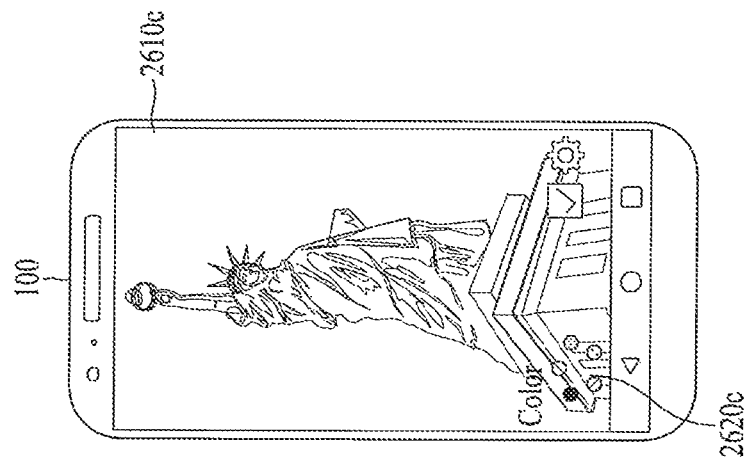

MOBILE TERMINAL AND CONTROLLING METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2015-0148159, filed on Oct. 23, 2015, the contents of which are hereby incorporated by reference herein in its entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for performing a stabilization correction or a preset correction depending on whether a destabilization is recognized from at least one object contained in an image.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Meanwhile, when an image is captured, if a subject or camera moves, a destabilization of an object corresponding to the subject can be recognized from the captured image. In doing so, it may be requested to correct a destabilization of a desired image using another image captured behind or ahead of the desired image, an image containing the same subject, or the like.

SUMMARY OF THE INVENTION

Accordingly, the present invention is directed to a mobile terminal and controlling method thereof that substantially obviate one or more of the problems due to limitations and disadvantages of the related art.

One object of the present invention is to provide a mobile terminal and controlling method thereof, by which a destabilization of an object contained in an image preferred by a user can be easily handled.

Another object of the present invention is to provide a mobile terminal and controlling method thereof, by which a destabilization correction or a preset correction can be performed depending on a presence or non-presence of a destabilization of an object contained in an image in case of sensing the same input signal for the image.

Technical tasks obtainable from the present invention are non-limited by the above-mentioned technical tasks. And, other unmentioned technical tasks can be clearly understood from the following description by those having ordinary skill in the technical field to which the present invention pertains.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a mobile terminal according to one embodiment of the present invention includes a display, and a controller operably coupled to the display and configured to cause the display to display a first image, cause the display to display a second image when destabilization of at least one object included in the first image is detected, the second image being an image of which destabilization correction is performed on the at least one object, and cause the display to display a third image when no destabilization of the at least one object is detected in the first image, the third image being an image of which preset correction is performed on the first image To further achieve these and other advantages and in accordance with the purpose of the present invention, as embodied and broadly described, a method of controlling a mobile terminal according to the present invention includes the steps of displaying a first image on a display, displaying a second image when destabilization of at least one object included in the first image is detected, the second image being an image of which destabilization correction is performed on the at least one object, and displaying a third image when no destabilization of the at least one object is detected in the first image, the third image being an image of which a preset correction is performed on the first image.

Accordingly, the present invention provides the following effects and/or features.

First of all, according to one embodiment of the present invention, a destabilization of an object contained in an image preferred by a user can be easily handled.

Secondly, a destabilization correction or a preset correction can be performed depending on a presence or non-presence of a destabilization of an object contained in an image in case of sensing the same input signal for the image.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 14 is a diagram for one example of correcting a destabilization of a specific region contained in an image in a mobile terminal according to one embodiment of the present invention;

FIG. 17 is a diagram for one example of extracting a feature point on performing a destabilization correction in a mobile terminal according to one embodiment of the present invention;

FIG. 18 is a diagram for one example of entering an editing mode in a state that a plurality of thumbnail images are displayed in a mobile terminal according to one embodiment of the present invention;

FIGS. 26A, 26B, and 26C are diagrams for one example of a preset correction performed on an image displayed on a mobile terminal according to one embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
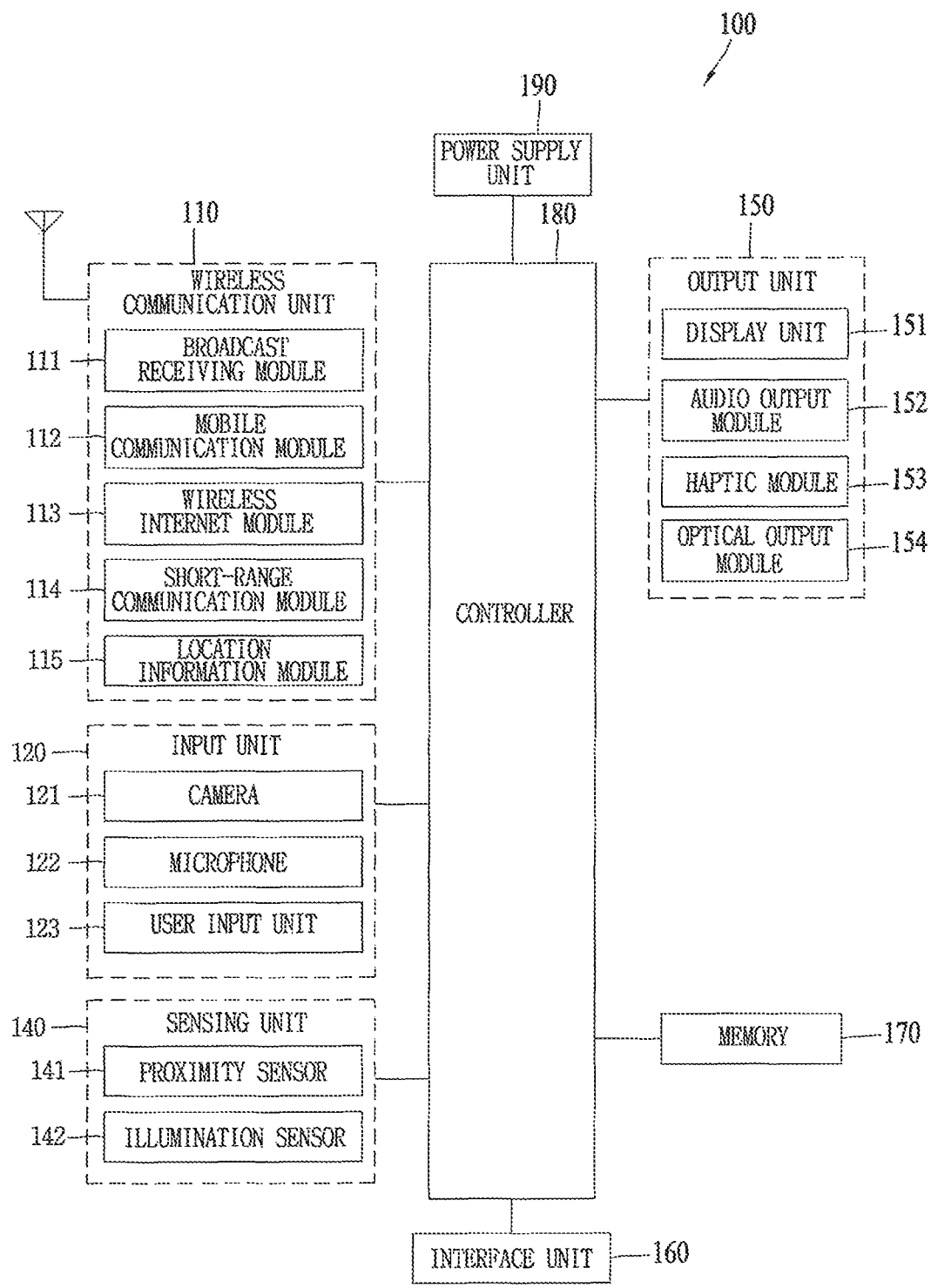
FIG. 1A is a block diagram of a mobile terminal in accordance with the present disclosure.
Figure 1B:
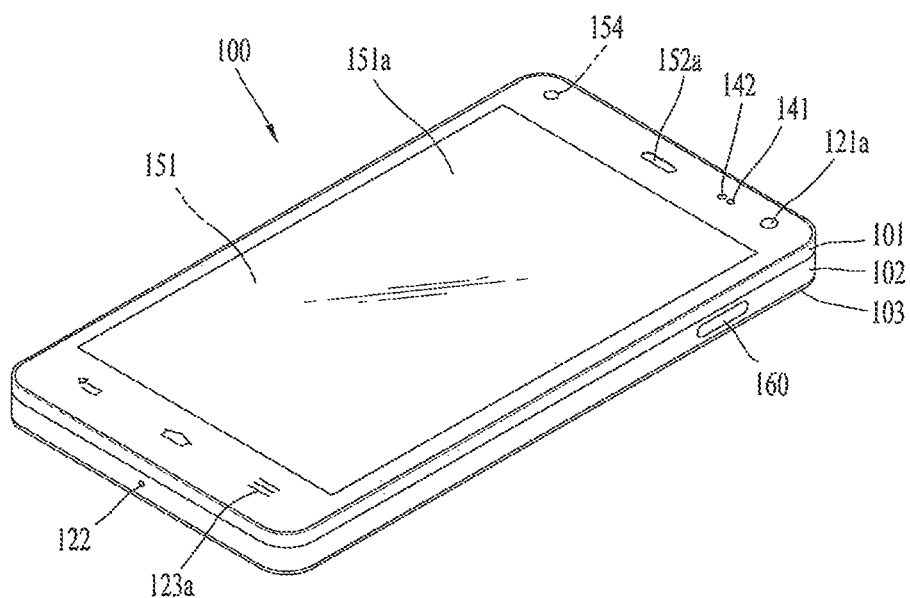
FIGS. 1B and 1C are conceptual views of one example of the mobile terminal, viewed from different directions.
Figure 1C:
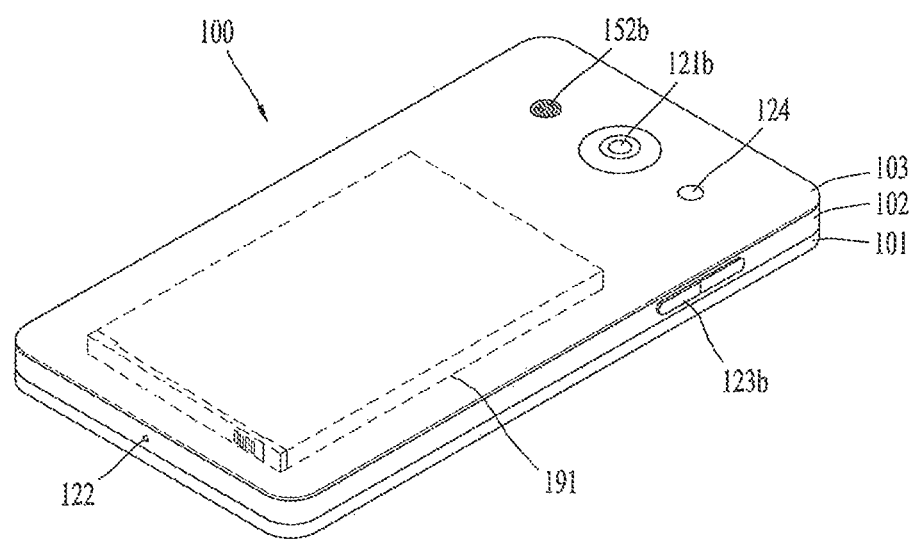

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, informations inputted or outputted through the components mentioned in the foregoing description or runs an application program saved in the memory 170, thereby providing or processing an information or function appropriate for to a user.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components can cooperatively operate to implement operations, controls or controlling methods of a mobile terminal according to various embodiments of the present invention mentioned in the following description. The operations, controls or controlling methods of the mobile terminal can be implemented on the mobile terminal by running at least one application program saved in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be equipped with the display unit 151, the $1^{st}$ audio output unit 152a, the proximity sensor 141, the illumination sensor 142, the optical output unit 154, the $1^{st}$ camera 121a, the $2^{nd}$ camera 121b, the $1^{st}$ manipulating unit 123a, the $2^{nd}$ manipulating unit 123b, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, according to the present invention, it is able to display information processed by the mobile terminal using a flexible display. This is described in detail with reference to the accompanying drawings as follows.

Figure 2:
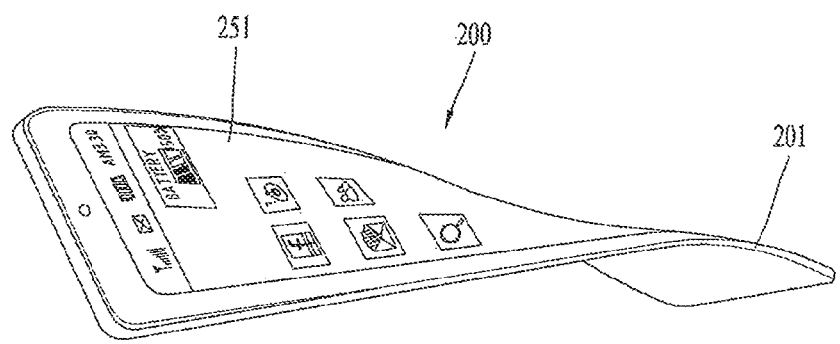
FIG. 2 is a conceptual view of a deformable mobile terminal according to an alternative embodiment of the present disclosure.

FIG. 2 is a conceptual view of a deformable mobile terminal according to an alternative embodiment of the present invention.

In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state(or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
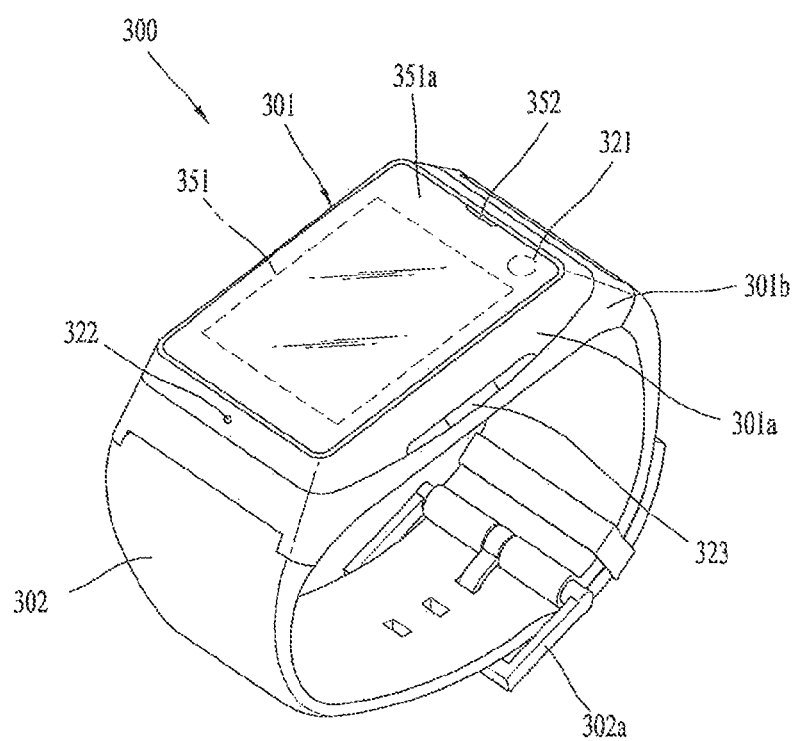
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment.

As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
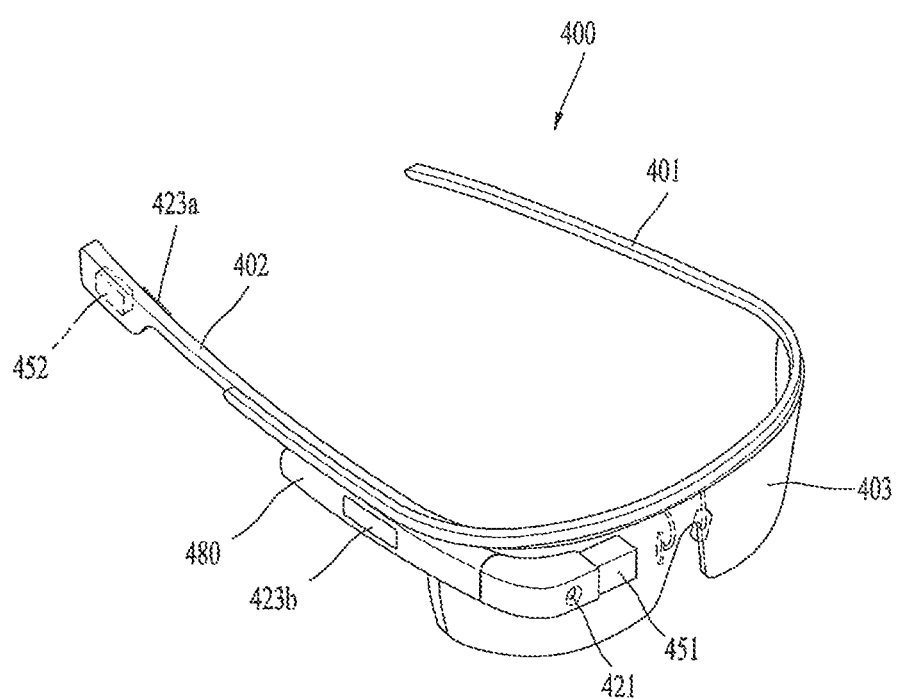
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment.

The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing.

The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail.

Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A(Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality(RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal.

Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB(Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e.g., a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

According to embodiments shown in FIGS. 5 to 36, when a captured image is displayed on a mobile terminal, a method of correcting an image depending on whether a destabilization of an object contained in the image is recognized or detected is described.

According to embodiments shown in FIGS. 5 to 36, operations performed in the mobile terminal can be controlled by the controller 180 shown in FIG. 1A. For clarity of the following description, such operations may be illustrated and described as performed/controlled by the mobile terminal.

In the following description, FIGS. 6 to 23 relate to an embodiment of a destabilization correction of at least one object included in an image. FIGS. 24 to 32 relate to an embodiment for performing a correction other than a destabilization correction on an image. And, FIGS. 33 to 36 relate to an embodiment for storing or sharing a correction completed image.

Figure 5:
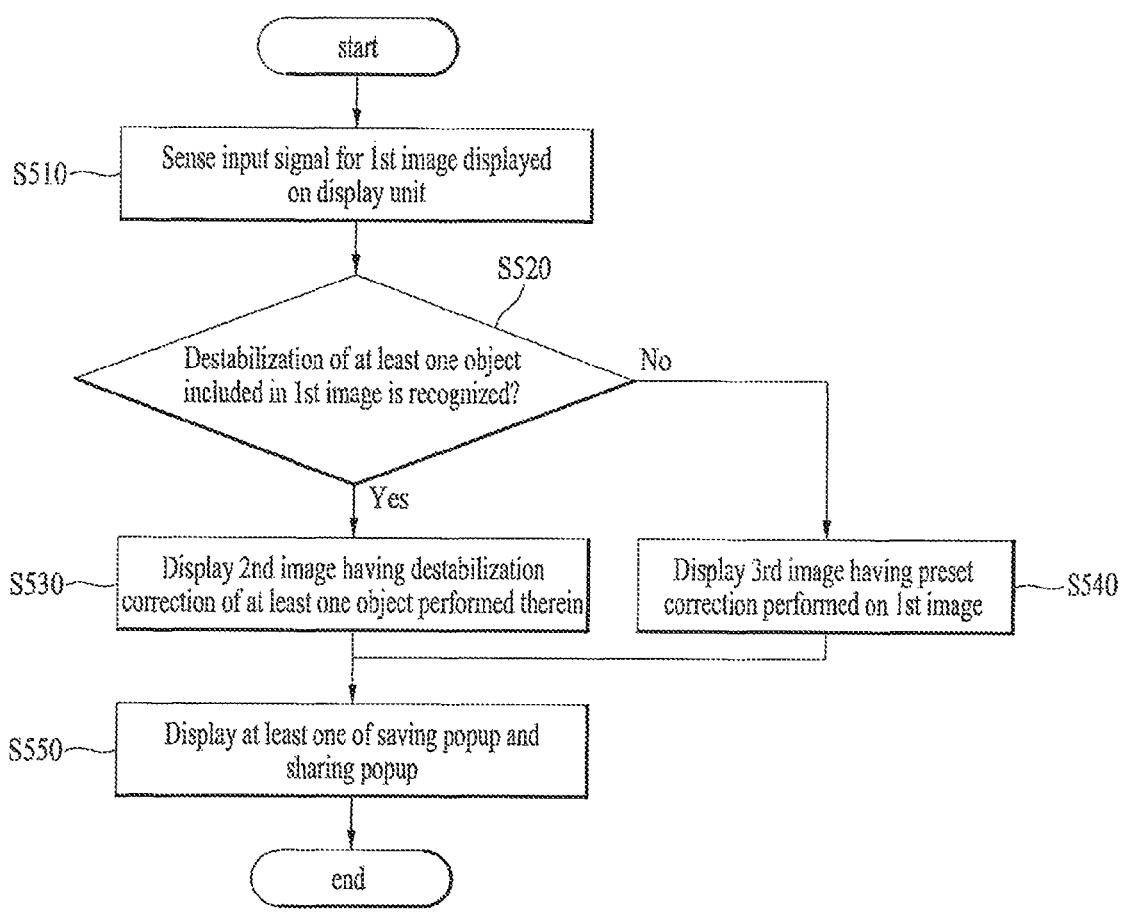
FIG. 5 is a flowchart for a method of controlling a mobile terminal according to one embodiment of the present invention.

FIG. 5 is a flowchart for a method of controlling a mobile terminal according to one embodiment of the present invention. The respective steps shown in FIG. 5 may be controlled by the controller of the mobile terminal shown in FIG. 1A.

Referring to FIG. 5, while a $1^{st}$ image displayed on the display unit, the mobile terminal can sense a $1^{st}$ input signal [S510]. In this case, the $1^{st}$ input signal may include a pinch-out touch input or a double tap touch input. This shall be described with reference to FIG. 8 later.

Subsequently, the mobile terminal can determine whether a destabilization of at least one object included in a $1^{st}$ image is recognized [S520]. In this case, the destabilization of the at least one object included in the $1^{st}$ image may include a case that the camera for taking the $1^{st}$ image is destabilized or a case that a subject is destabilized. This shall be described in detail with reference to FIG. 15 later.

If the destabilization of the at least one object included in the image is recognized in the step S520, the mobile terminal can display a $2^{nd}$ image on which a destabilization correction of the at least one object has been performed [S530]. This shall be described in detail with reference to FIGS. 6 to 23 later.

On the other hand, if the destabilization of the at least one object included in the image is not recognized in the step S520, it is able to display a 3rd image resulting from performing a preset correction on the $1^{st}$ image [S540]. This shall be described in detail with reference to FIGS. 24 to 32 later.

If the destabilization correction or the preset correction on the $1^{st}$ image is completed, the mobile terminal can display at least one of a saving popup or a sharing popup [S550]. This shall be described in detail with reference to FIGS. 33 to 36 later. For instance, the step S530 and the step S550 may be performed simultaneously. For another instance, the step S540 and the step S550 may be performed simultaneously.

Figure 6:
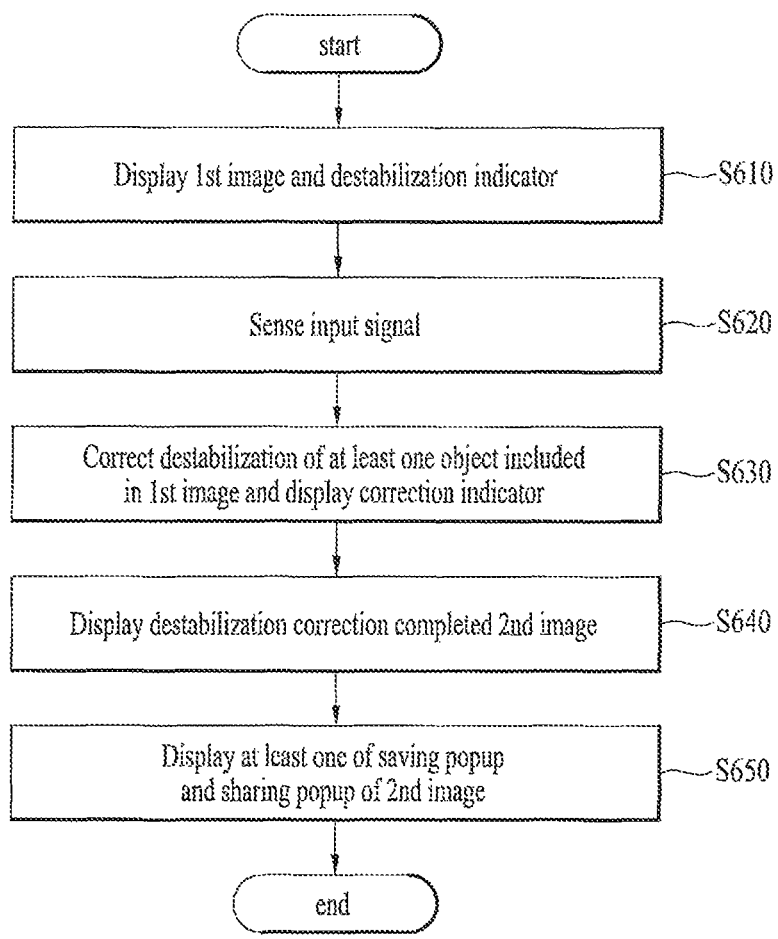
FIG. 6 is a flowchart for a method of controlling a mobile terminal according to one embodiment of the present invention.

FIG. 6 is a flowchart for a method of controlling a mobile terminal according to one embodiment of the present invention. In particular, FIG. 6 shows one example of restoring an image if the destabilization of the at least one object included in the image, which is described with reference to FIG. 5, is recognized. The respective steps shown in FIG. 6 may be controlled by the controller of the mobile terminal shown in FIG. 1A.

Referring to FIG. 6, the mobile terminal can display a $1^{st}$ image and a destabilization indicator indicating a destabilization of at least one object included in the $1^{st}$ image [S610].

Subsequently, the mobile terminal can sense an input signal [S620]. In this case, the input signal may correspond to the same input signal mentioned in the description with reference to FIG. 5.

Subsequently, the mobile terminal performs a destabilization correction of the at least one object included in the $1^{st}$ image and is then able to display a correction indicator [S630]. The correction indicator shall be described with reference to FIG. 8 and FIG. 9 later.

Subsequently, the mobile terminal can display a $2^{nd}$ image having a destabilization correction completed [S640].

Thereafter, the mobile terminal can display at least one of a saving popup or a sharing popup of the $2^{nd}$ image [S650]. In doing so, the step S630 and the step S640 may be performed simultaneously.

Figure 7:
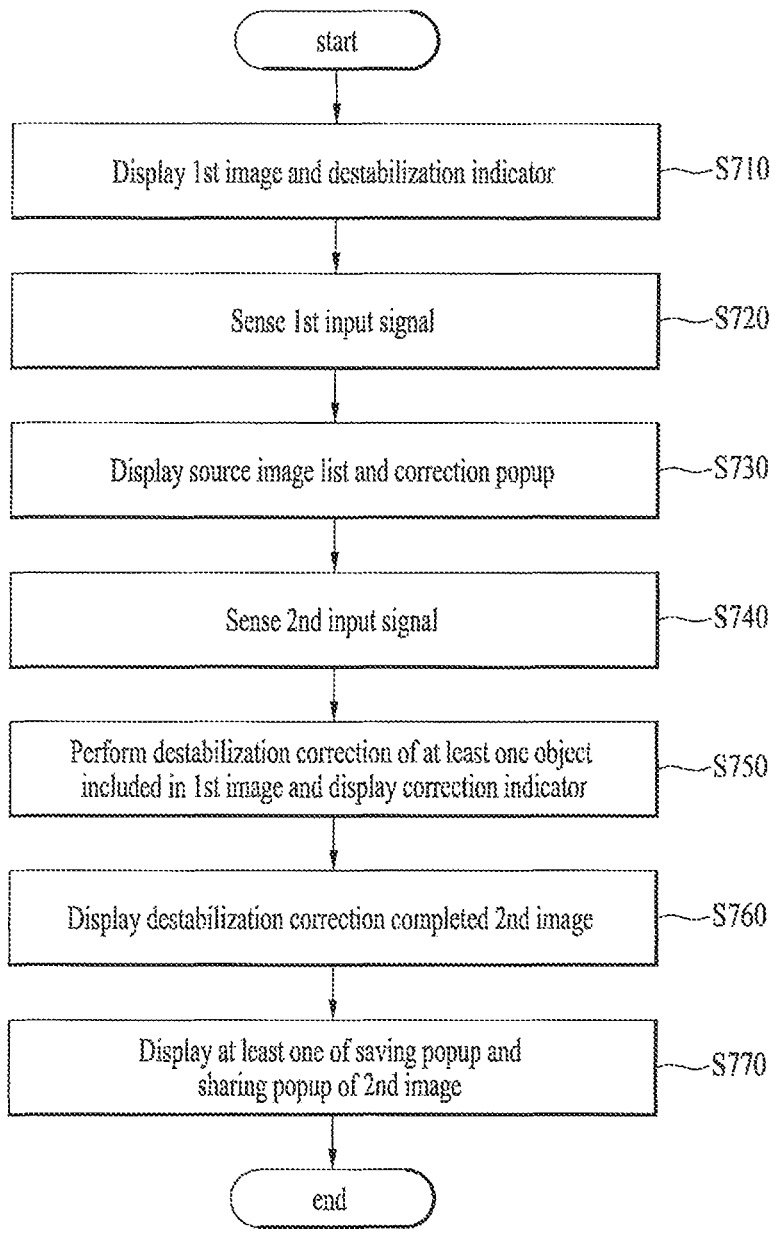
FIG. 7 is a flowchart for a method of controlling a mobile terminal according to one embodiment of the present invention.

FIG. 7 is a flowchart for a method of controlling a mobile terminal according to one embodiment of the present invention.

In particular, FIG. 7 shows another example of restoring an image if the destabilization of the at least one object included in the image, which is described with reference to FIG. 5, is recognized. The respective steps shown in FIG. 7 may be controlled by the controller of the mobile terminal shown in FIG. 1A. And, the substance redundant with the former substance mentioned in the description with reference to FIG. 6 shall be omitted from the description of the steps shown in FIG. 7.

Referring to FIG. 7, the mobile terminal can display a destabilization indicator indicating a destabilization of at least one object included in an image displayed on the display unit [S710]. Subsequently, the mobile terminal can sense a $1^{st}$ input signal [S720].

Subsequently, in response to the $1^{st}$ input signal, the mobile terminal can display a source image list and a correction popup [S730]. The source image list shall be described in detail with reference to FIG. 12 later.

Subsequently, the mobile terminal can sense a $2^{nd}$ input signal [S740]. In this case, the $2^{nd}$ input signal may correspond to a signal for selecting a source image included in the source image list and then performing a destabilization correction.

Subsequently, in response to the $2^{nd}$ input signal, the mobile terminal performs a destabilization correction of at least one object included in a $1^{st}$ image and is able to display a correction indicator [S750].

Subsequently, the mobile terminal can display a $2^{nd}$ image of which destabilization correction is completed [S760]. And, the mobile terminal can display at least one of a saving popup and a sharing popup of the $2^{nd}$ image [S770].

In the following description, FIGS. 8 to 11 show one example of sensing an input signal for performing a destabilization correction on a $1^{st}$ image displayed on the display unit.

Figure 8:
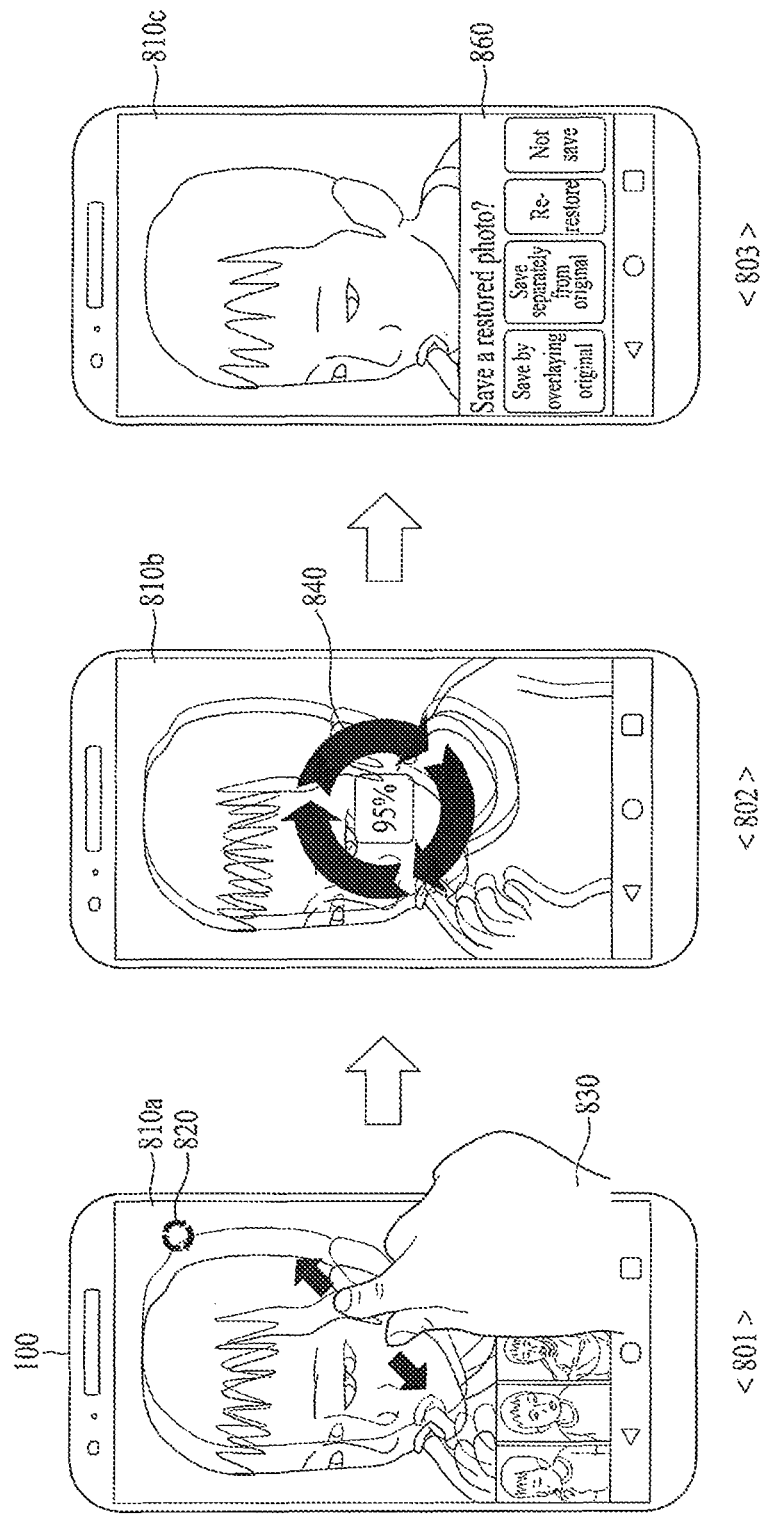
FIG. 8 is a diagram for one example of correcting a destabilization of an image in a mobile terminal according to one embodiment of the present invention.

FIG. 8 is a diagram for one example of correcting a destabilization of an image in a mobile terminal according to one embodiment of the present invention. In particular, the embodiment shown in FIG. 8 shows one example of automatically performing a destabilization correction in response to a single input signal for an image.

First of all, the mobile terminal can sense an input signal (not shown in the drawing) for searching for an image in a gallery application [not shown in FIG. 8]. For instance, the input signal may correspond to a flicking input applied in a left or right direction. In particular, a user can select an image to perform a destabilization correction thereon by searching the image in a gallery.

Subsequently, referring to FIG. 8 <801>, the mobile terminal can display a $1^{st}$ image 810a on the display unit. In this case, the $1^{st}$ image 810a may include at least one object. For instance, the object may include one of a thing, a person, and the like. According to the embodiment shown in FIG. 8, the $1^{st}$ image 810a includes one object corresponding to a child. And, the at least one object included in the $1^{st}$ image 810a may be in a shaken state or a blurred state.

Moreover, in doing so, the shaken (or blurred) state of the object may correspond to a state that the object is shaken (or blurred) due to an excessive preset rate of the object. For instance, the preset rate may amount to 30%, by which the preset rate is non-limited. Hence, in a state that at least one object included in the $1^{st}$ image is shaken (or blurred) at 20%, the mobile terminal may determine that a destabilization is not sensed.

For instance, a shaken (or blurred) state of at least one object may correspond to a state that a camera provided to the mobile terminal is moved on photographing. For another instance, a shaken (or blurred) state of at least one object may correspond to a state that a real subject corresponding to the at least one object moves in a fixed state of a camera provided to the mobile terminal. This shall be described in detail with reference to FIGS. 15 to 17 later.

In doing so, the mobile terminal is able to display a destabilization indicator 820 indicating a destabilization of the at least one object included in the $1^{st}$ image 810a. In this case, the destabilization indicator 820 may be displayed in various forms and may be displayed at various locations on the display unit. For instance, the destabilization indicator 820 may be displayed in a state that an object included in an image is shaken. Moreover, for example, the destabilization indicator 820 may be displayed only if a destabilization correction can be performed on a shaken object included in an image.

Meanwhile, while the $1^{st}$ image 810a is displayed, the mobile terminal can sense an input signal 830. In this case, the input signal 830 may correspond to a signal for correcting a destabilization of the $1^{st}$ image 810a. For instance, the input signal 830 may correspond to one of a pinch-out touch input and a double tap touch input, by which the input signal 830 is non-limited. And, the input single 830 can include one of various input signals.

In this case, in response to an input signal, the mobile terminal can correct a destabilization of the $1^{st}$ image 810a. The destabilization correction of the $1^{st}$ image 810a shall be described in detail again with reference to FIGS. 15 to 17 later. For instance, the mobile terminal automatically extracts a source image and is then able to perform the destabilization correction of the $1^{st}$ image 810a. For instance, the source image may correspond to an image saved in the mobile terminal other than the $1^{st}$ image 810a.

Referring to FIG. 8 <802>, the mobile terminal can display a $2^{nd}$ image 810b. In this case, the $2^{nd}$ image 810b may correspond to a real-time correction image on which a destabilization correction of the $1^{st}$ image 810a is currently performed. The mobile terminal may display a correction indicator 840 indicating a progress of the destabilization correction. According to the embodiment shown in FIG. 8, the correction indicator 840 can indicate that the destabilization correction of the $1^{st}$ image is performed 95%. The correction indicator 840 can be displayed in one of various forms and may be displayed at one of various locations on the display unit.

If the destabilization correction is completed, as shown in FIG. 8 <803>, the mobile terminal can display a $3^{rd}$ image 810c. In this case, the $3^{rd}$ image 810c may correspond to an image in which the destabilization correction of the at least one object included in the $1^{st}$ image 810a is completed. For instance, a destabilization correction completed state may correspond to a state that a destabilization correction of at least one object is completed 100%, by which the destabilization correction completed state is non-limited. And, the destabilization correction completed state may correspond to a state that the destabilization correction is not completed 100% in accordance with a user setting or a terminal setting.

In doing so, referring to FIG. 8 <803>, the mobile terminal can display a saving popup 860 on the $3^{rd}$ image 810c. The saving menu popup 860 may include at least one menu for determining whether to save the destabilization correction completed $3^{rd}$ image 810c or whether to perform a re-restoration. According to the embodiment shown in FIG. 8 <803>, the saving menu popup 860 may include a menu for saving by overlaying an original image, a menu for saving separately from an original image, a re-restoration menu, and a not-save menu.

Meanwhile, the mobile terminal may display a sharing popup (not shown in the drawing) on the $3^{rd}$ image 810c. The sharing menu popup may include at least one menu for determining whether to share the destabilization correction completed $3^{rd}$ image 810c. The saving menu or the sharing menu shall be described in detail again with reference to FIGS. 33 to 36 later.

On the other hand, FIG. 8 <802> may not correspond to an essential configuration. In particular, if the input signal 830 for the $1^{st}$ image 810a is sensed, the mobile terminal does not display a real-time destabilization correction of the $1^{st}$ image 810a but may be able to directly display the correction-completed $3^{rd}$ image 810c.

Figure 9:
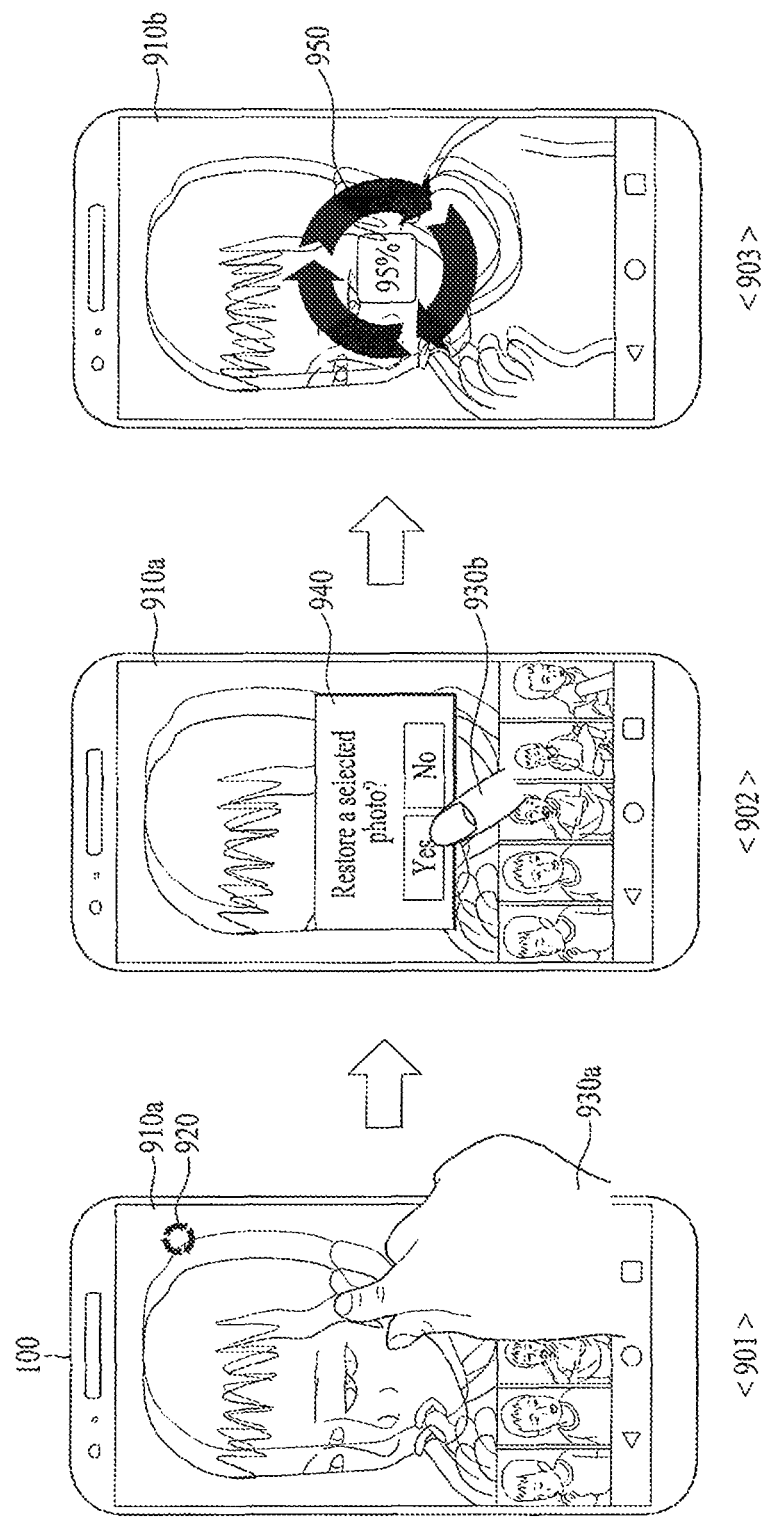
FIG. 9 is a diagram for one example of correcting a destabilization of an image in a mobile terminal according to one embodiment of the present invention.

FIG. 9 is a diagram for one example of correcting a destabilization of an image in a mobile terminal according to one embodiment of the present invention.

In particular, the embodiment shown in FIG. 9 shows one example of automatically performing a destabilization correction in response to a plurality of input signals for an image. The substance redundant with the former description with reference to FIG. 8 shall be omitted from the following description with reference to FIG. 9.

First of all, referring to FIG. 9 <901>, the mobile terminal can display a $1^{st}$ image 910a on the display unit. And, the mobile terminal can display a destabilization indicator 920 on the $1^{st}$ image 910a.

In doing so, while the $1^{st}$ image 910a is displayed, the mobile terminal can sense a $1^{st}$ input signal 930a. In this case, the $1^{st}$ input signal 930a may correspond to a signal for entering a destabilization correction mode. Moreover, the $1^{st}$ input signal 930a may correspond to the same input signal as mentioned in the description with reference to FIG. 8.

In this case, referring to FIG. 9 <902>, the mobile terminal can display a correction popup 940 on the $1^{st}$ image 910a. The correction popup 940 corresponds to a menu for a user to determine whether to perform a destabilization correction of the $1^{st}$ image 910a.

Moreover, in response to the $1^{st}$ input signal 930a, the mobile terminal can display a source image list on the $1^{st}$ image 910a. In this case, the source image list may correspond to a list including a source image used for the destabilization correction of the $1^{st}$ image 910a. This shall be described in detail again with reference to FIG. 12 later.

Subsequently, the mobile terminal can sense a $2^{nd}$ input signal 930b for a correction popup 940. For instance, the $2^{nd}$ input signal 930b may correspond to an input signal for correcting an image in the correction popup 940. In this case, in response to the $2^{nd}$ input signal 930b for 'yes', the mobile terminal can correct a destabilization of the $1^{st}$ image 910a. Besides, if the $2^{nd}$ input signal 930b is sensed from a location of 'no', the mobile terminal may remove the correction popup 940 without performing the destabilization correction of the $1^{st}$ image 910b (not shown in FIG. 9).

Hence, referring to FIG. 9 <903>, the mobile terminal can display a $2^{nd}$ image 910b, on which a real-time destabilization correction is currently performed, on the display unit. Moreover, in doing so, the mobile terminal displays a correction indicator 950 to display a progressive situation of the destabilization correction by real time.

Moreover, as mentioned in the foregoing description with reference to FIG. 8, if the destabilization correction is completed, the mobile terminal may display a saving popup or a sharing popup (not shown in FIG. 9).

Figure 10:
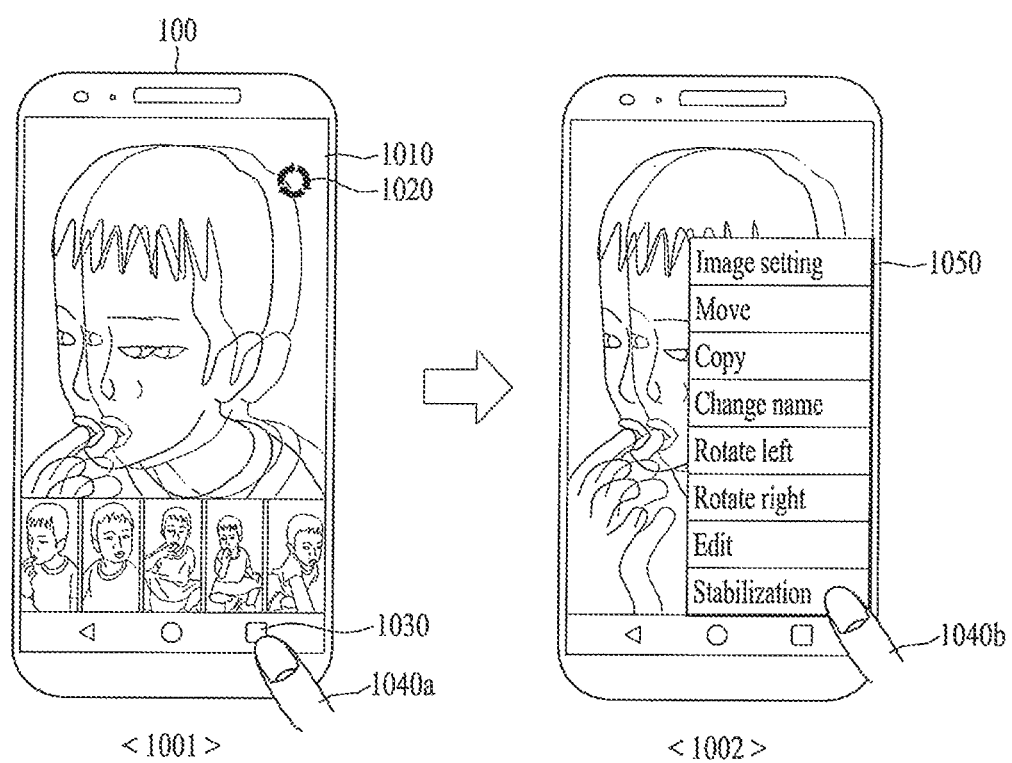
FIG. 10 is a diagram for one example of correcting a destabilization of an image in a mobile terminal according to one embodiment of the present invention.

FIG. 10 is a diagram for one example of correcting a destabilization of an image in a mobile terminal according to one embodiment of the present invention.

In particular, an embodiment shown in FIG. 10 relates to one example of performing a destabilization correction by selecting a separate menu for the destabilization correction. The substance redundant with the former description with reference to FIG. 8 shall be omitted from the following description with reference to FIG. 10.

First of all, referring to FIG. 10 <1001>, the mobile terminal can display an image 1010 and a destabilization indicator 1020 on the display unit. And, the mobile terminal can sense a $1^{st}$ input signal 1040a for a menu icon 1030 among a plurality of basic icons located on one side of the display unit.

In doing so, referring to FIG. 10 <1002>, the mobile terminal can display a menu popup 1050 on the display unit. For instance, the menu popup 1050 may include such items as image setting, move, copy, change name, rotate counter-clockwise, rotate clockwise, edit, and stabilization (or, destabilization restoration), by which items included in the image setting menu are non-limited.

Subsequently, the mobile terminal can sense a $2^{nd}$ input signal 1040b for the stabilization (or, destabilization restoration) item in the image setting menu 1050. If so, as mentioned in the foregoing descriptions with reference to FIG. 8 <802> and FIG. 8 <803>, the mobile terminal performs a destabilization correction of an image and is then able to display a sharing popup menu or a saving popup menu in case of completion of the correction [not shown in FIG. 10].

FIGS. 11A, 11B, 11C and 11D are diagrams for one example of various input signals sensed to perform a destabilization correction in a mobile terminal according to one embodiment of the present invention.

For instance, the mobile terminal can perform a destabilization correction of an image in response to an input signal for a popup menu displayed on the display unit. For instance, referring to FIG. 11A, based on a short touch input signal 1121 sensed from a correction popup menu 1110, the mobile terminal can perform a destabilization correction of a displayed image.

For another instance, in response to one of various touch inputs sensed from the display unit, the mobile terminal can perform a destabilization correction of an image. For instance, referring to FIG. 11B, the mobile terminal can display an indicator 1130 for a destabilization recognized object in the image. Moreover, in case of recognizing a long touch input 1122 to the indicator 1130, the mobile terminal can perform a destabilization correction of the image.

Figure 11A:
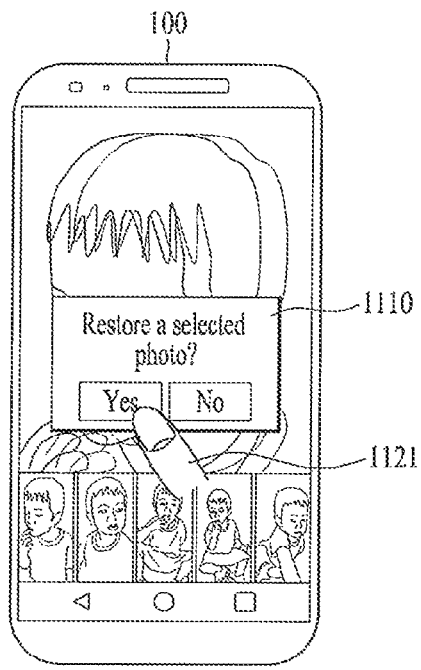
FIGS. 11A, 11B, 11C and 11D are diagrams for one example of various input signals sensed to perform a destabilization correction in a mobile terminal according to one embodiment of the present invention.
Figure 11B:
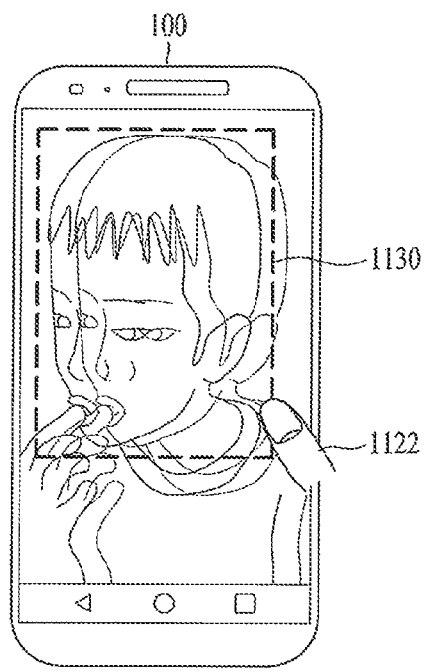
Figure 11C:
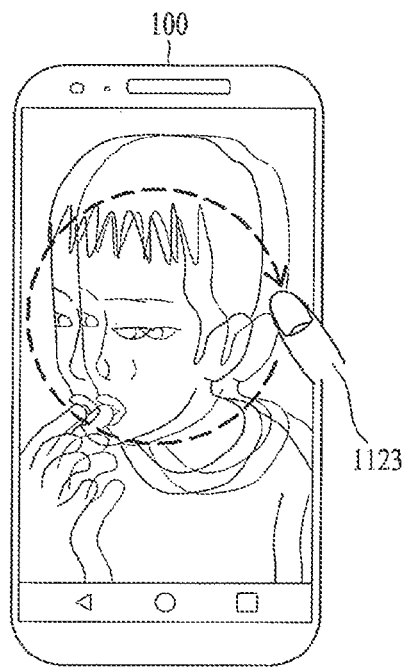
Figure 11D:
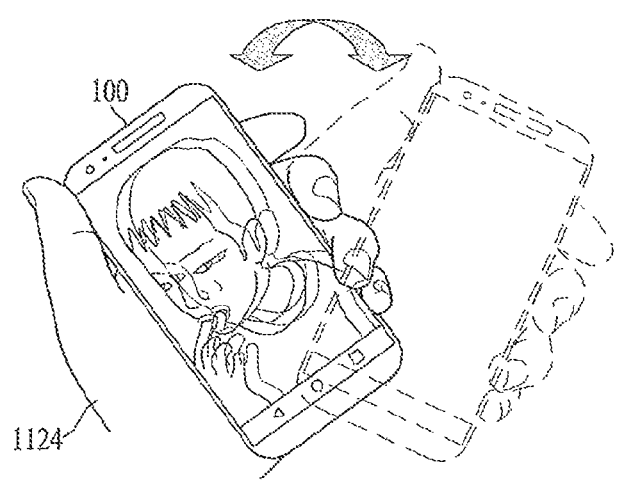

Moreover, for instance, referring to FIG. 11C, the mobile terminal can display a circle type outline for a destabilization recognized object in the image. If a circle drawing touch input 1123 for the outline is recognized, the mobile terminal can perform a destabilization correction of the image. Besides, if the circle drawing touch input 1123 is additionally recognized, (not shown in FIG. 11C), the mobile terminal can increase a progress rate of the destabilization correction of the image. Moreover, for instance, if a pinch-out touch input for the image is sensed, the mobile terminal can perform a destabilization correction of the image (not shown in FIGS. 11A, 11B, 11C and 11D).

For another instance, in response to an input sensed by one of various sensors provided to the mobile terminal, the mobile terminal can perform a destabilization correction of an image. For instance, referring to FIG. 11D, if a signal indicating that the mobile terminal is shaken by a user 1124 is sensed, the mobile terminal can perform a destabilization correction of a displayed image. Besides, if the sensed destabilization increases, the mobile terminal can increase a progress rate of the destabilization correction of the displayed image [not shown in FIG. 11D].

Figure 12A:
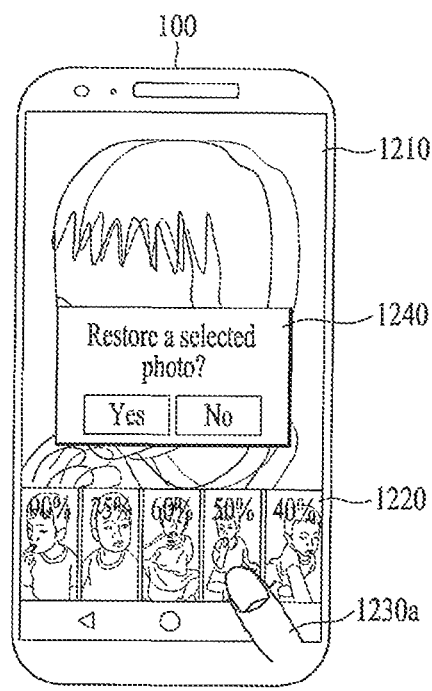
FIGS. 12A and 12B are diagrams for one example of setting a source image used for a destabilization correction in a mobile terminal according to one embodiment of the present invention.
Figure 12B:
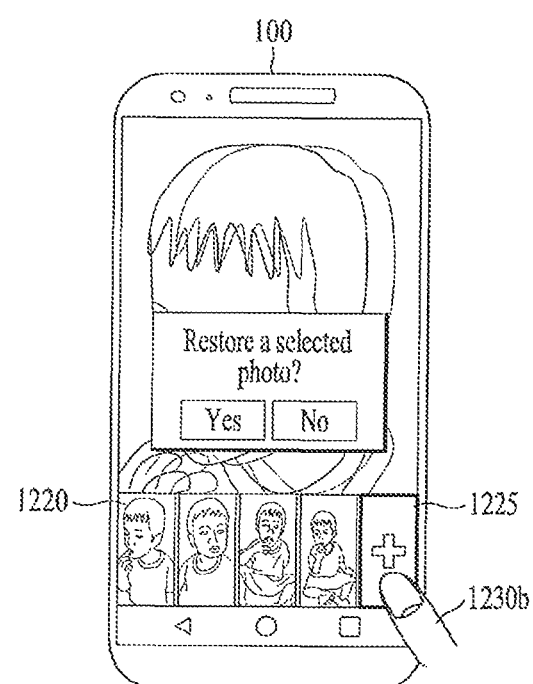

FIGS. 12A and 12B are diagrams for one example of setting a source image used for a destabilization correction in a mobile terminal according to one embodiment of the present invention. In particular, an embodiment shown in FIGS. 12A and 12B shows a case that a source image is set in the above-mentioned state described with reference to FIG. 9 <902>.

According to the present invention, a source image used for a destabilization correction of a displayed image 1210 may be extracted automatically or manually by a user. In case of the former embodiment described with reference to FIG. 9, if an input signal for a correction popup is sensed, it corresponds to a case that the mobile terminal corrects a destabilization of an image displayed on the display unit by automatically extracting a source image. Moreover, while a correction popup 1240 is displayed, an embodiment shown in FIGS. 12A and 12B corresponds to a case that the mobile terminal senses an input signal for a source image instead of an input signal for the correction popup 1240.

For instance, the mobile terminal can sense a $1^{st}$ input signal 1230a for extracting a source image from a source image list 1220 including at least one source image. In particular, the $1^{st}$ input signal 1230a for extracting the source image may include a plurality of input signals. In this case, the mobile terminal can perform a destabilization correction of the image 1210 based on the source image corresponding to a location at which the $1^{st}$ input signal 1230a is sensed.

Meanwhile, the at least one source image included in the source image list 1220 can be displayed in a manner that the mobile terminal automatically determines similarity. For instance, it is able to determine the similarity between the at least one source image included in the source image list 1220 and an image becoming a target of a destabilization correction depending on identicalness or similarity of an object included in an image. Moreover, for another instance, it is able to determine the similarity between the at least one source image included in the source image list 1220 and an image becoming a target of a destabilization correction depending on similarity or identicalness of a composition in which an object included in an image is disposed. Moreover, the similarity may be determined depending on identicalness/similarity of a timing of capturing an image. Meanwhile, the reference for the similarity determination may be non-limited by the above description. For instance, it is able to determine at least one source image in accordance with one of various determination references.

As the similarity is determined, the mobile terminal can display at least one or more source images in descending order. And, the mobile terminal can display an indicator indicating similarity on each source image. Moreover, the indicator indicating the similarity can be represented in one of various forms such as color, type and the like as well as in the numeral shown in FIG. 12A. Referring to FIG. 12A, the mobile terminal can display a plurality of source images in descending order based on the similarity to the image 1210. In doing so, if an additional input signal is sensed from a user, the mobile terminal may change the display order of a plurality of the source images.

For another instance, referring to FIG. 12B, the mobile terminal can sense a $2^{nd}$ input signal 1230b for an additional icon 1225 to extract an additional source image other than the source images included in the source image list 1220. In doing so, the mobile terminal searches for an image other than the source images displayed on the source image list 1220 and is then able to add the found image as a source image.

Figure 13A:
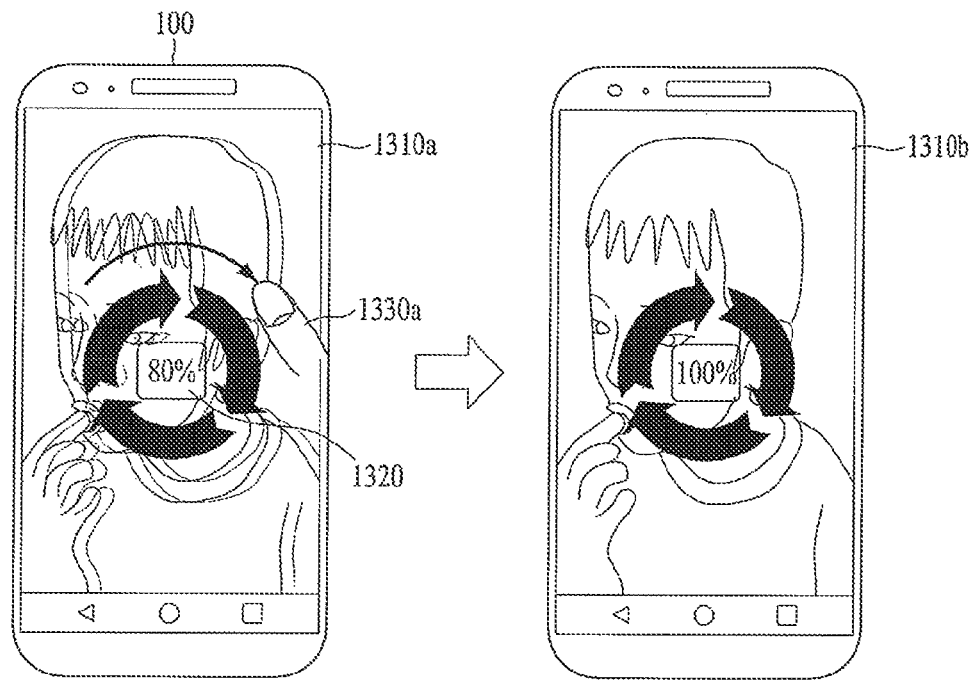
FIGS. 13A and 13B are diagrams for one example of adjusting a level for correcting a destabilization of an image in a mobile terminal according to one embodiment of the present invention.
Figure 13B:
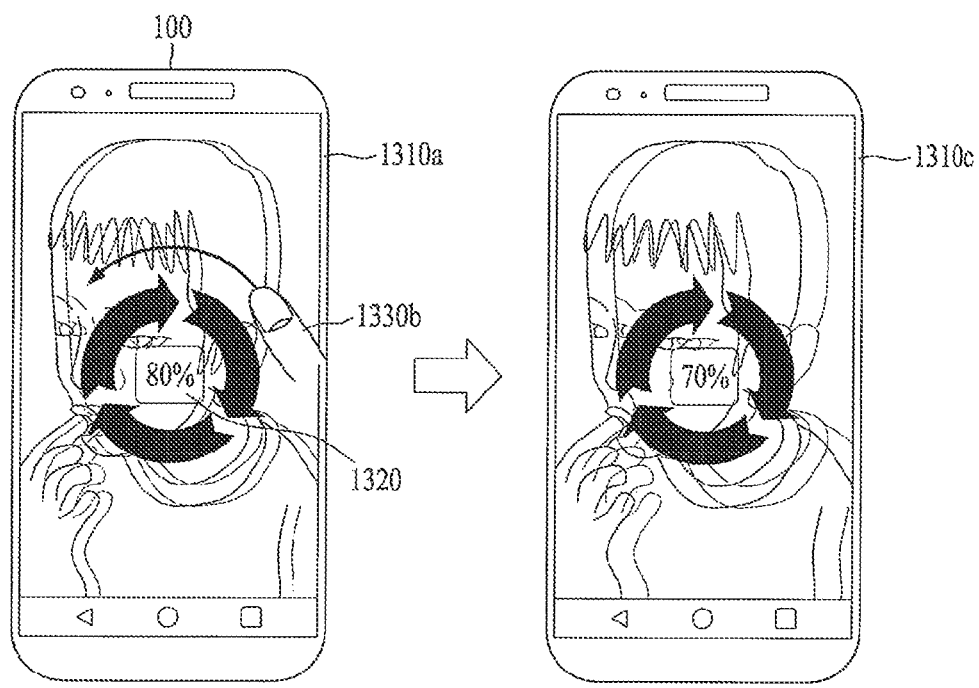

FIGS. 13A and 13B are diagrams for one example of adjusting a level for correcting a destabilization of an image in a mobile terminal according to one embodiment of the present invention. Regarding this example, an embodiment shown in FIGS. 13A and 13B indicates a case of additionally sensing an input signal in the former state described with reference to FIG. 8 <802>.

For instance, referring to FIG. 13A, the mobile terminal can sense a $1^{st}$ input signal 1330a during a destabilization correction of a displayed $1^{st}$ image 1310a. When the mobile terminal senses the $1^{st}$ input signal 1330a, the mobile terminal can display a correction indicator 1320 indicating that the destabilization correction of the $1^{st}$ image 1310a is completed 80%. In this case, the $1^{st}$ input signal 1330a may correspond to a drag touch input of clockwise rotation. Moreover, the $1^{st}$ input signal 1330a may correspond to a signal for correcting an image more clearly.

In this case, in response to the $1^{st}$ input signal 1330a, the mobile terminal can correct the $1^{st}$ image 1310a more clearly. Hence, referring to the right part of FIG. 13A, the mobile terminal can display a $2^{nd}$ image 1310b. In this case, the $2^{nd}$ image 1310b may correspond to an image corrected to be clearer than the $1^{st}$ image 1310a. And, the mobile terminal is able to indicate that the destabilization correction is completed 100% using the correction indicator 1320.

For another instance, referring to FIG. 13B, the mobile terminal can sense a $2^{nd}$ input signal 1330b during a destabilization correction of a displayed $1^{st}$ image 1310a. In this case, the $2^{nd}$ input signal 1330b may correspond to a drag touch input of counterclockwise rotation. Moreover, the $2^{nd}$ input signal 1330b may correspond to a signal for correcting an image in a manner that the image is further shaken or blurred.

In this case, in response to the $2^{nd}$ input signal 1330b, the mobile terminal can correct the $1^{st}$ image 1310a to become further blurred. Hence, referring to the right part of FIG. 13B, the mobile terminal can display a $3^{rd}$ image 1310c. In this case, the $3^{rd}$ image 1310c may correspond to an image corrected to be more blurred or shaken than the $1^{st}$ image 1310a. And, the mobile terminal is able to indicate that the destabilization correction is completed 70% using the correction indicator 1320.

FIG. 14 is a diagram for one example of correcting a destabilization of a specific region contained in an image in a mobile terminal according to one embodiment of the present invention.

First of all, referring to FIG. 14 <1401>, the mobile terminal can display a $1^{st}$ image 1410 on the display unit. In this case, the $1^{st}$ image 1410 may include at least one destabilization recognized object. In doing so, the mobile terminal may sense a $1^{st}$ input signal 1421 for a specific region of the $1^{st}$ image 1410. For instance, the $1^{st}$ input signal 1421 may correspond to a double tab input. Moreover, according to the embodiment shown in FIG. 14, the $1^{st}$ input signal 1421 may be sensed from a position corresponding to a mouth in the $1^{st}$ image 1410.

In this case, as shown in FIG. 14 <1402>, the mobile terminal can display an enlarged image 1415 of a partial region on the $1^{st}$ image 1410. In this case, the $2^{nd}$ input signal 1422 may correspond to a drag touch input in a top direction or a flicking touch input. Alternatively, the $2^{nd}$ input signal 1422 may correspond to an input applied in a manner of starting from a source image list 1430 and then ending to one side of the $1^{st}$ image 1410.

In doing so, referring to FIG. 14 <1403>, in response to the $2^{nd}$ input signal 1422, the mobile terminal may display a partial image included in the source image list 1430 as a source image 1440 on one side of the $1^{st}$ image 1410. And, the source image 1440 may correspond to at least one image.

Subsequently, referring to FIG. 14 <1403>, the mobile terminal can sense a $3^{rd}$ input signal 1423 for the enlarged image. In this case, the $3^{rd}$ input signal 1423 may correspond to a short touch input. In doing so, as shown in FIG. 14 <1404>, the mobile terminal may display a restoration popup 1450 on the display unit. Hence, a user can determine whether to perform a destabilization correction of a specific region of the $1^{st}$ image 1410 based on the source image 1440.

Besides, if a destabilization correction is completed by sensing an input signal for 'Yes' on the restoration popup 1450, the mobile terminal can display a sharing popup or a saving popup (not shown in FIG. 14). Moreover, the step <1402> of determining the source image manually can be skipped from the embodiment shown in FIG. 14. In this case, if the $1^{st}$ input signal 1421 is sensed in the step <1401> shown in FIG. 14, the mobile automatically extracts a source image and is then able to directly perform a destabilization correction of an image in case of sensing an input signal for the restoration popup 1450.

Meanwhile, if a destabilization is recognized from an image, it may include at least one of a state that a subject is moved on photographing and a state that a camera is moved. In this case, the mobile terminal can generate a clear image by restoring the destabilization of the image through 3-dimensional restoration. In the following description, a method of performing a destabilization correction of an image through 3-dimensional restoration is described in detail with reference to FIGS. 15 to 17 as follows.

Figure 15:
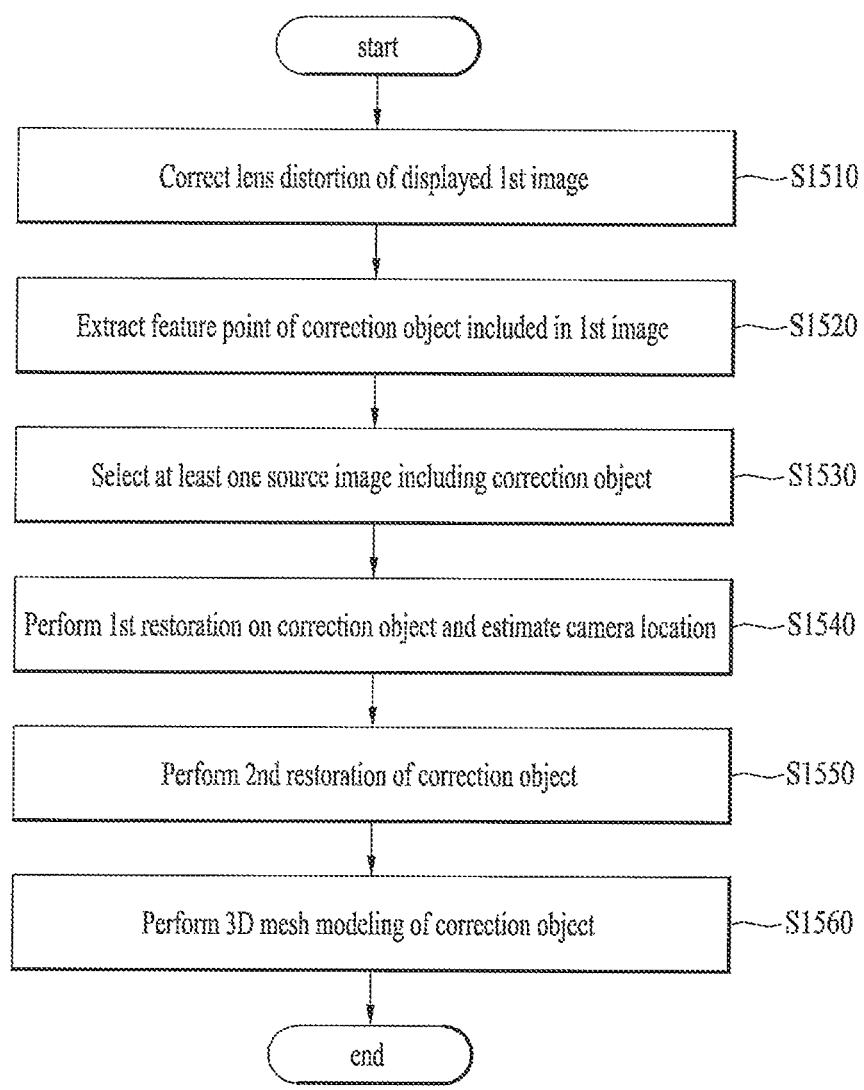
FIG. 15 is a flowchart for a method of controlling a mobile terminal according to one embodiment of the present invention.

FIG. 15 is a flowchart for a method of controlling a mobile terminal according to one embodiment of the present invention.

In particular, FIG. 15 shows one example of if a destabilization is recognized from at least one object included in an image described with reference to FIG. 5, performing a destabilization correction. The respective steps described in the following can be controlled by the controller of the mobile terminal shown in FIG. 1A.

Referring to FIG. 15, the mobile terminal can perform a lens distortion correction of a displayed $1^{st}$ image [S1510]. Due to the shape of the lens of the camera, a lens distortion effect may be generated from an image. In this case, the mobile terminal can perform a lens distortion correction by performing calibration.

Subsequently, the mobile terminal can extract a feature point of a correction object included in the $1^{st}$ image [S1520]. In particular, in a state that the calibration has been performed, the mobile terminal can extract a feature point of a destabilization recognized object from the $1^{st}$ image. And, the correction object may correspond to an object that becomes a target of a destabilization correction in the $1^{st}$ image. The feature point extraction is described in detail with reference to FIG. 17 as follows.

FIG. 17 is a diagram for one example of extracting a feature point on performing a destabilization correction in a mobile terminal according to one embodiment of the present invention.

Referring to FIG. 17 <1701>, the mobile terminal can extract a feature point 1715 from a $1^{st}$ image 1710. In this case, the feature point may correspond to a point that is easily identifiable from a correction object and is easily extractable despite variation of a viewpoint or an illumination of a camera, or the like. According to the embodiment shown in FIG. 17, the mobile terminal can extract a point corresponding to a position of eye, nose or mouth as the feature point 1715.

Subsequently, the mobile terminal can select at least one source image including a correction object [S1530]. In particular, the mobile terminal can select or extract an image including a feature point corresponding to the feature point extracted from the $1^{st}$ image. This is described in detail with reference to FIG. 17 as follows.

An image 1720 shown in FIG. 17 <1702> may correspond to a $1^{st}$ source image, while an image 1730 shown in FIG. 17 <1703> may correspond to a $2^{nd}$ source image. The $1^{st}$ source image and the $2^{nd}$ source image may include feature points 1725 and 1735, each of which is identical to a feature point extracted from a correction object, respectively. In this case, each of the $1^{st}$ source image and the $2^{nd}$ source image may correspond to an image saved in the mobile terminal or an image selectable through a search in the mobile terminal.

Subsequently, the mobile terminal performs a $1^{st}$ restoration on the correction object and is able to estimate a camera location [S1540]. In particular, the mobile terminal can perform the $1^{st}$ restoration on the correction object using the information extracted from the source image. In this case, the $1^{st}$ restoration may correspond to a sparse 3-dimensional (3D) restoration. And, the information extracted from the source image may include RGB information of the point corresponding to the feature point and the like. Moreover, the mobile terminal can estimate the camera location, which will be described in detail with reference to FIG. 16 later.

The mobile terminal can perform a $2^{nd}$ restoration of the correction object [S1550]. In this case, the $2^{nd}$ restoration may correspond to a dense 3-dimensional (3D) restoration. For instance, the mobile terminal can automatically perform the $2^{nd}$ restoration on the $1^{st}$ restoration performed image. For another instance, in case that an input signal is sensed, the mobile terminal may perform the $2^{nd}$ restoration. For instance, according to the embodiment described with reference to FIGS. 13A and 13B, the $1^{st}$ restoration performed image may correspond to a left part of the drawing shown in FIG. 13A and the $2^{nd}$ restoration performed image may correspond to a right part of the drawing shown in FIG. 13A.

Subsequently, the mobile terminal can perform a 3-dimensional (3D) mesh modeling of the correction object [S1560]. Regarding this, the mobile terminal can perform the 3D mesh modeling on the 3D restoration completed image by one of various methods available for those skilled in the art. For instance, one of the methods for the 3D mesh modeling may include a hole filing.

Figure 16:
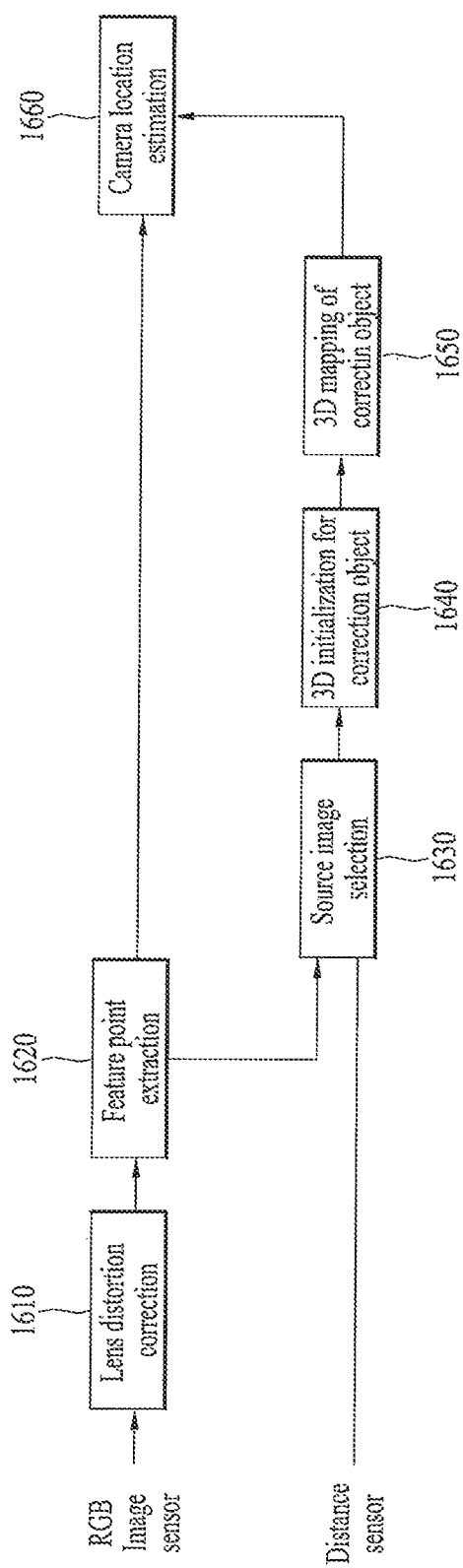
FIG. 16 is a diagram for one example that a destabilization correction is performed by a sensor provided to a mobile terminal according to one embodiment of the present invention.

FIG. 16 is a diagram for one example that a destabilization correction is performed by a sensor provided to a mobile terminal according to one embodiment of the present invention.

According to the present invention, the sensing unit of the mobile terminal may include various sensors mentioned in the foregoing description, and more particularly, an RGB image sensor (hereinafter named 'image sensor') and a distance sensor in association with the 3D restoration. The mobile terminal can perform the 3D restoration using data received from at least one of the image sensor and the distance sensor. In particular, it is able to perform the 3D restoration using the data sensed by the image sensor and the data sensed by the distance sensor.

For instance, using the data received from the image sensor, the mobile terminal can perform a lens distortion correction 1610 mentioned in the foregoing description with reference to FIG. 17. The mobile terminal can perform an extraction 1620 of a feature point on a $1^{st}$ image. Using the data received from the distance sensor, the mobile terminal makes a selection 1630 of a source image and is able to perform a 3D initialization 1640 in a real size and a 3D mapping 1650 of a correction object. And, the mobile terminal can make an estimation 1660 of a camera location using the data received from the image sensor and the data received from the distance sensor.

FIGS. 18 to 23 show a method of performing a destabilization correction in a state that a plurality of thumbnail images are displayed.

FIG. 18 is a diagram for one example of entering an editing mode in a state that a plurality of thumbnail images are displayed in a mobile terminal according to one embodiment of the present invention.

First of all, the mobile terminal can run a gallery application (not shown in FIG. 18). If the gallery application is run, the mobile terminal can display a thumbnail images corresponding to a plurality of images saved in the mobile terminal, respectively.

Referring to FIG. 18 <1801>, the mobile terminal can sense a gesture signal 1820. In particular, the mobile terminal can sense the gesture signal 1820 while a plurality of thumbnail images are displayed. For instance, the gesture signal 1820 may correspond to a signal of shaking the mobile terminal right and left (or, from side to side). And, the gesture signal 1820 may be sensed through the acceleration sensor provided to the mobile terminal.

If so, referring to FIG. 18 <1802>, the mobile terminal can enter an editing mode 1830. For instance, FIG. 18 <1801> may correspond to a display mode and FIG. 18 <1802> may correspond to an editing mode. In this case, unlike the display mode, the editing mode 1830 may correspond to a state that each image corresponding to the thumbnail image is editable. Output results in the editing mode 1830 and the display mode may be different from each other in response to the same input signal. For instance, in case of sensing a circular drag touch input, the mobile terminal can scroll a plurality of the thumbnail images in the display mode. On the other hand, in case of sensing a circular drag touch input, the mobile terminal can perform a destabilization correction on some of a plurality of the thumbnail images in the editing mode.

In response to the gesture signal 1820, the mobile terminal enters the editing mode 1830 and is able to display a destabilization indicator 1831. For instance, the mobile terminal can display the destabilization indicator 1831 on an image including a destabilization recognized object among real images corresponding to a plurality of the displayed thumbnail images, respectively. Referring to FIG. 18 <1802>, the destabilization indicator 1831 may be denoted by a dotted line on an outline of the corresponding thumbnail image, by which the present invention is non-limited.

Meanwhile, in case of sensing a scroll touch or a short touch input in the editing mode 1830, the mobile terminal ends the editing mode 1830 and is able to switch to the display mode (not shown in FIG. 18). In doing so, the mobile terminal may delete the destabilization indicator.

Figure 19A:
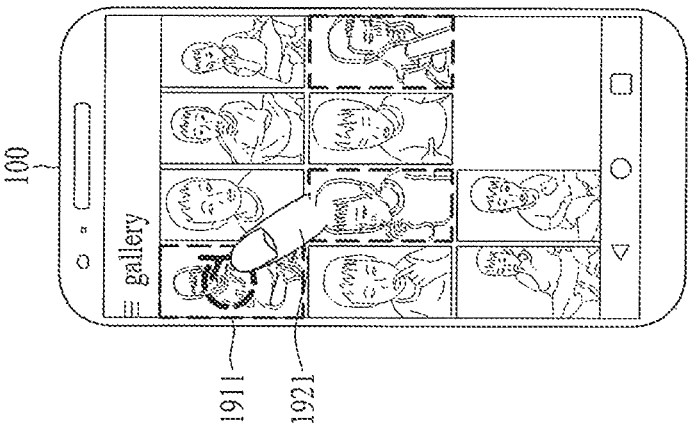
FIGS. 19A, 19B and 19C are diagrams for one example of performing a destabilization correction in a state that a plurality of thumbnail images are displayed in a mobile terminal according to one embodiment of the present invention.
Figure 19B:
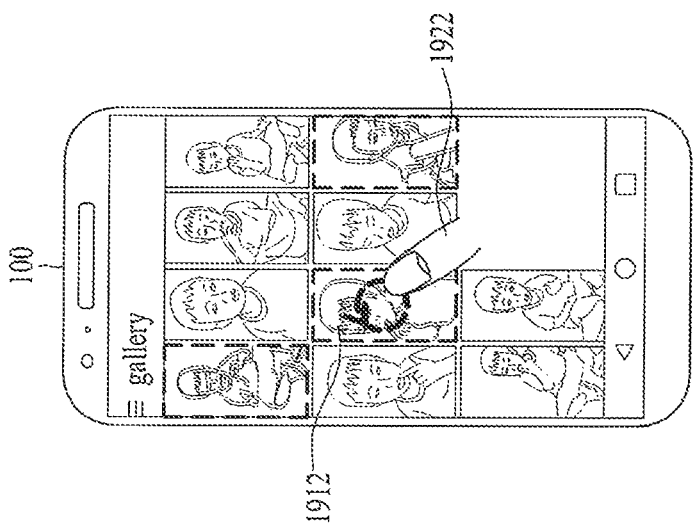
Figure 19C:
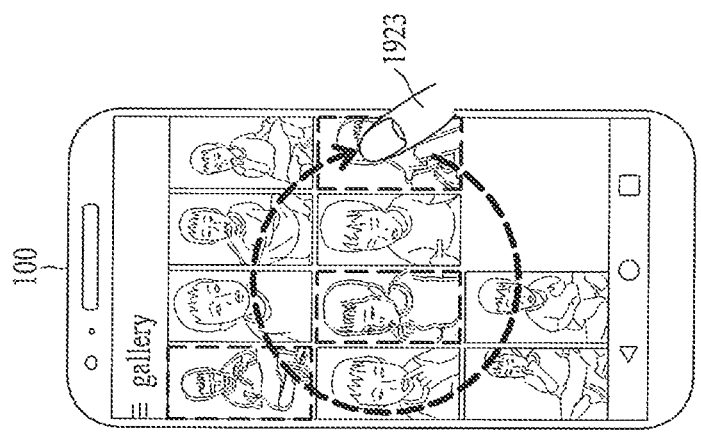

FIGS. 19A, 19B and 19C are diagrams for one example of performing a destabilization correction in a state that a plurality of thumbnail images are displayed in a mobile terminal according to one embodiment of the present invention.

In particular, FIGS. 19A, 19B and 19C show a method of performing a destabilization correction of real images corresponding to a plurality of thumbnail images in a state that a plurality of the thumbnail images are displayed. Regarding this, the embodiment shown in FIGS. 19A, 19B and 19C assumes that the editing mode mentioned in the foregoing description with reference to FIG. 18 has been entered. Moreover, assume that the destabilization indicators are displayed on some of a plurality of the thumbnail images, respectively.

The embodiment shown in FIG. 19A and FIG. 19B shows a case of performing a destabilization correction on one of a plurality of the thumbnail images. And, the embodiment shown in FIG. 19C shows a case of performing a destabilization correction on a plurality of destabilization recognized images among a plurality of thumbnail images simultaneously.

For instance, referring to FIG. 19A, while a plurality of thumbnail images are displayed, the mobile terminal can sense a $1^{st}$ input signal 1921 from a $1^{st}$ thumbnail image 1911. For instance, the $1^{st}$ input signal 1921 may correspond to a drag touch input applied in a manner of rotating clockwise on the $1^{st}$ thumbnail image 1911. In this case, the mobile terminal may perform a destabilization correction of an image corresponding to a position at which the $1^{st}$ input signal was sensed. In this case, the destabilization correction may correspond to a correction for further clarifying an image. And, the image corresponding to the $1^{st}$ input signal sensed position may correspond to a real image corresponding to the $1^{st}$ thumbnail image 1911.

For another instance, referring to FIG. 19B, while a plurality of thumbnail images are displayed, the mobile terminal can sense a $2^{nd}$ input signal 1922 from a $2^{nd}$ thumbnail image 1912. For instance, the $2^{nd}$ input signal 1922 may correspond to a drag touch input applied in a manner of rotating counterclockwise on the $2^{nd}$ thumbnail image 1912. In this case, the mobile terminal may perform a destabilization correction of an image corresponding to a position at which the $2^{nd}$ input signal was sensed. Yet, unlike the former embodiment shown in FIG. 19A, the destabilization correction according to the embodiment shown in FIG. 19B may correspond to a correction for further shaking or blurring an image.

For further instance, referring to FIG. 19C, while a plurality of thumbnail images are displayed, the mobile terminal can sense a $3^{rd}$ input signal 1923. For instance, the $3^{rd}$ input signal 1923 may correspond to a drag touch input applied in a manner of rotating clockwise on a plurality of the thumbnail images. In this case, the mobile terminal may perform a destabilization correction of a plurality of the thumbnail images having the destabilization indicators displayed thereon. In particular, the mobile terminal can simultaneously correct a plurality of the destabilization recognized images.

On the other hand, for another further instance not shown in FIG. 10, the mobile terminal may sense a drag touch input applied in a manner of rotating counterclockwise in a plurality of thumbnail images. In this case, the mobile terminal may simultaneously correct a plurality of the destabilization recognized images to be further blurred or shaken.

Figure 20:
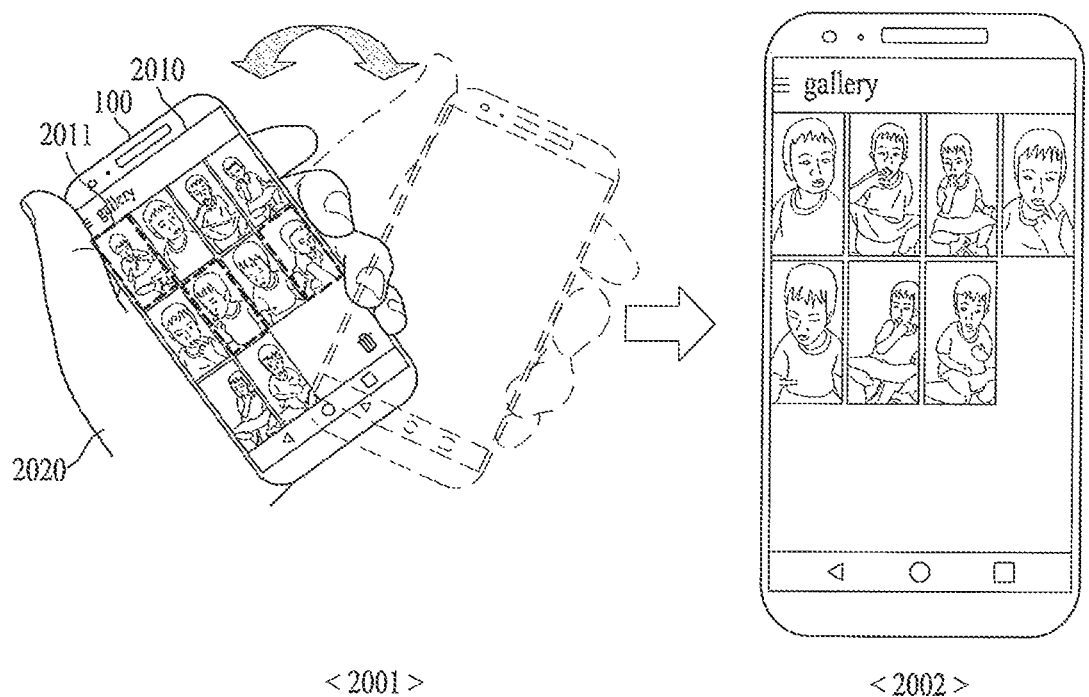
FIG. 20 is a diagram for one example of deleting a destabilization recognized image in a state that a plurality of thumbnail images are displayed in a mobile terminal according to one embodiment of the present invention.

FIG. 20 is a diagram for one example of deleting a destabilization recognized image in a state that a plurality of thumbnail images are displayed in a mobile terminal according to one embodiment of the present invention.

Regarding this, the embodiment shown in FIG. 20 assumes that the editing mode mentioned in the foregoing description with reference to FIG. 18 has been entered. Moreover, the embodiment shown in FIG. 20 assumes that destabilization indicators 2011 are displayed on some of a plurality of the thumbnail images, respectively.

First of all, referring to FIG. 20 <2001>, the mobile terminal can sense a gesture signal 2020 in editing mode 2010. In this case, the gesture signal 2020 may correspond to the same gesture signal as mentioned in the foregoing description with reference to FIG. 18. In doing so, in response to the gesture signal 2020, the mobile terminal can delete the image having the destabilization indicator 2011 displayed thereon. Moreover, referring to FIG. 20 <2002>, the mobile terminal can display thumbnail images of destabilization unrecognized images on the display unit only. For instance, after the destabilization recognized images have been deleted, the mobile terminal can enter a display mode from the editing mode.

Meanwhile, if an input signal (not shown in the drawing) for each image having the destabilization indicator 2011 displayed thereon is sensed, the mobile terminal may delete a real image corresponding to the thumbnail image from which the input signal (not shown in the drawing) is sensed [not shown in FIG. 20].

Figure 21:
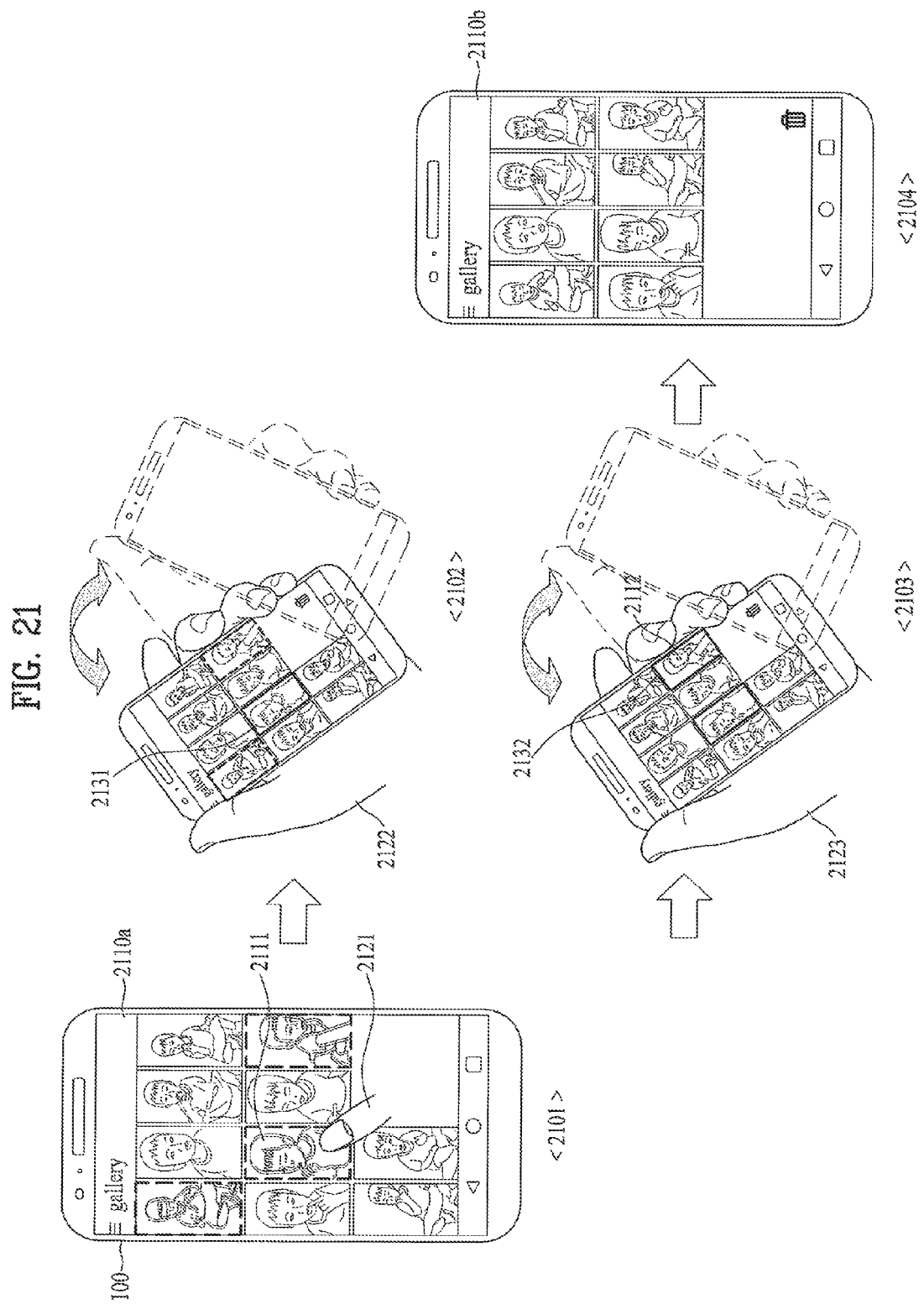
FIG. 21 is a diagram for one example of deleting a destabilization recognized image in a state that a plurality of thumbnail images are displayed in a mobile terminal according to one embodiment of the present invention.

FIG. 21 is a diagram for one example of deleting a destabilization recognized image in a state that a plurality of thumbnail images are displayed in a mobile terminal according to one embodiment of the present invention.

Regarding this, the embodiment shown in FIG. 21 assumes that the editing mode mentioned in the foregoing description with reference to FIG. 18 has been entered. Moreover, the embodiment shown in FIG. 21 assumes that destabilization indicators are displayed on some of a plurality of the thumbnail images, respectively.

First of all, referring to FIG. 21 <2101>, the mobile terminal can sense a 1st input signal 2121 for a $1^{st}$ thumbnail image 2111, on which a destabilization indicator is displayed, in an editing mode 2110a. In this case, the $1^{st}$ input signal 2121 may correspond to a short touch input. In doing so, referring to FIG. 21 <2102>, the mobile terminal can display a selection indicator 2131 on the $1^{st}$ thumbnail image 2111 from which the Pt input signal 2121 is sensed.

Subsequently, the mobile terminal can sense a $2^{nd}$ input signal 2122. In this case, the $2^{nd}$ input signal 2122 may correspond to a gesture input of shaking the mobile terminal. If so, referring to FIG. 21 <2103>, the mobile terminal can also display a selection indicator 2132 on a $2^{nd}$ thumbnail image 2112 other than the $1^{st}$ thumbnail image 2111. In particular, the mobile terminal can display the selection indicator 2132 on the $2^{nd}$ thumbnail image 2112 containing the feature in common with the $1^{st}$ thumbnail image 2111.

For instance, the common feature between the $1^{st}$ thumbnail image 2111 and the $2^{nd}$ thumbnail image 2112 may correspond to a case that a timing point of capturing a real image lies in the same range. For instance, a timing point of capturing an image corresponding to each of the $1^{st}$ thumbnail image 2111 and the $2^{nd}$ thumbnail image 2112 may correspond to the same date. For another instance, the common feature between the $1^{st}$ thumbnail image 2111 and the $2^{nd}$ thumbnail image 2112 may correspond to a case that a real image captured place is the same place.

Subsequently, the mobile terminal can sense a $3^{rd}$ input signal 2123. In this case, the $3^{rd}$ input signal 2123 may correspond to a gesture input of shaking the mobile terminal.

For instance, in response to the $3^{rd}$ input signal 2123, the mobile terminal deletes the selection indicator displayed thumbnail image and is able to display the rest of a plurality of the thumbnail images. In particular, the mobile terminal deletes the selection indicator displayed thumbnail image, ends the editing mode, and is able to enter a display mode 2110b.

For another instance, in response to the $3^{rd}$ input signal 2123, the mobile terminal may perform a destabilization correction of a real image corresponding to the selection indicator displayed thumbnail image.

Figure 22:
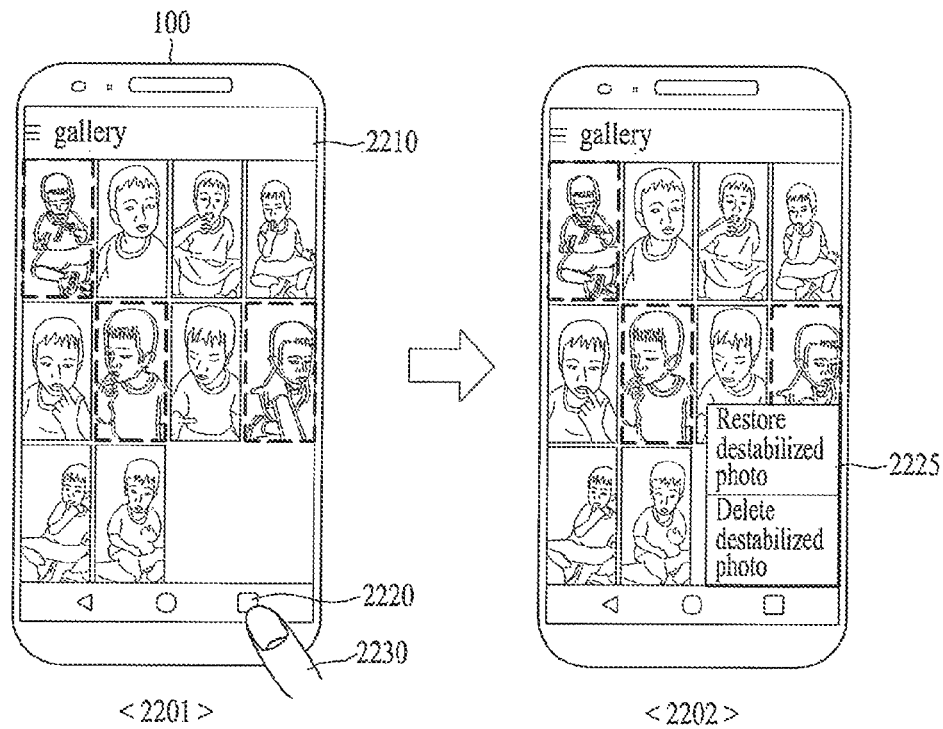
FIG. 22 is a diagram for one example of performing a destabilization correction in a state that a plurality of thumbnail images are displayed in a mobile terminal according to one embodiment of the present invention.

FIG. 22 is a diagram for one example of performing a destabilization correction in a state that a plurality of thumbnail images are displayed in a mobile terminal according to one embodiment of the present invention. Regarding this, the embodiment shown in FIG. 22 assumes that the editing mode 2210 mentioned in the foregoing description with reference to FIG. 18 has been entered.

First of all, referring to FIG. 22 <2201>, while a plurality of thumbnail images are displayed, the mobile terminal can sense an input signal 2230 for a menu icon 2220 located on one side of the display unit.

In this case, referring to FIG. 22 <2202>, the mobile terminal can display a menu available in an editing mode in form of a popup 2225. In doing so, if an addition input signal for a menu 'Restore destabilized photos' is sensed, the mobile terminal can perform a destabilization correction of real images corresponding to destabilization indicator displayed thumbnail images among a plurality of the thumbnail images. On the other hand, if an addition input signal for a menu 'Delete destabilized photos' is sensed, the mobile terminal can delete real images corresponding to destabilization indicator displayed thumbnail images among a plurality of the thumbnail images.

Figure 23A:
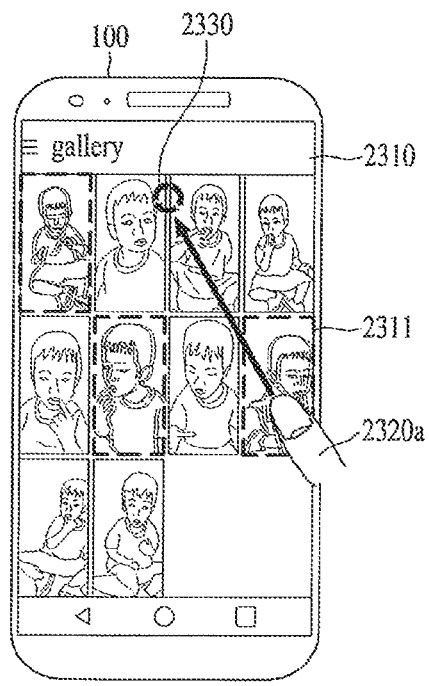
FIGS. 23A and 23B are diagrams for one example of performing a destabilization correction or an image deletion in a state that a plurality of thumbnail images are displayed in a mobile terminal according to one embodiment of the present invention.
Figure 23B:
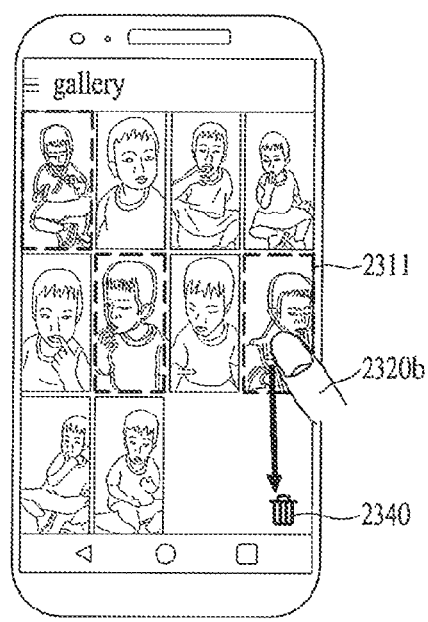

FIGS. 23A and 23B are diagrams for one example of performing a destabilization correction or an image deletion in a state that a plurality of thumbnail images are displayed in a mobile terminal according to one embodiment of the present invention. Regarding this, the embodiment shown in FIGS. 23A and 23B assumes that the editing mode 2310 mentioned in the foregoing description with reference to FIG. 18 has been entered.

For instance, the mobile terminal can perform a destabilization correction of a real image corresponding to an input signal sensed thumbnail image. Referring to FIG. 23 A, the mobile terminal can sense a $1^{st}$ input signal 2320a for a $1^{st}$ thumbnail image 2311. In particular, the $1^{st}$ input signal 2320a may correspond to a drag touch input in a top direction. In doing so, as the $1^{st}$ input signal 2320a starts, if a preset length is exceeded, the mobile terminal can display a restoration icon 2330 on a prescribed region of the display unit. In this case, the preset length may correspond to a length capable of confirming that the $1^{st}$ input signal corresponds to a drag touch in a top direction. For example, the preset length may correspond to a length greater than 1 centimeter, by which the present example is non-limited. For example, the prescribed region of the display unit may correspond to a top end portion.

If the $1^{st}$ input signal 2320a ends to a region corresponding to the restoration icon 2330, the mobile terminal can perform a destabilization correction of the $1^{st}$ thumbnail image 2311. For example, the region corresponding to the restoration icon 2330 may include a region having the restoration icon 2330 displayed on the display unit and a region adjacent to the restoration icon displayed region of the display unit.

For another instance, the mobile terminal can delete a real image corresponding to an input signal sensed thumbnail image. Referring to FIG. 23B, the mobile terminal can sense a $2^{nd}$ input signal 2320b for the $1^{st}$ thumbnail image 2311. In particular, the $2^{nd}$ input signal 2320b may correspond to a drag touch input in a bottom direction. In doing so, as the $2^{nd}$ input signal 2320b starts, if a preset length is exceeded, the mobile terminal can display a deletion icon 2340 on a prescribed region of the display unit. For example, the prescribed region of the display unit may correspond to a bottom end portion.

If the $2^{nd}$ input signal 2320b ends to a region corresponding to the deletion icon 2340, the mobile terminal can delete the $1^{st}$ thumbnail image 2311 from a thumbnail image list.

Figure 24:
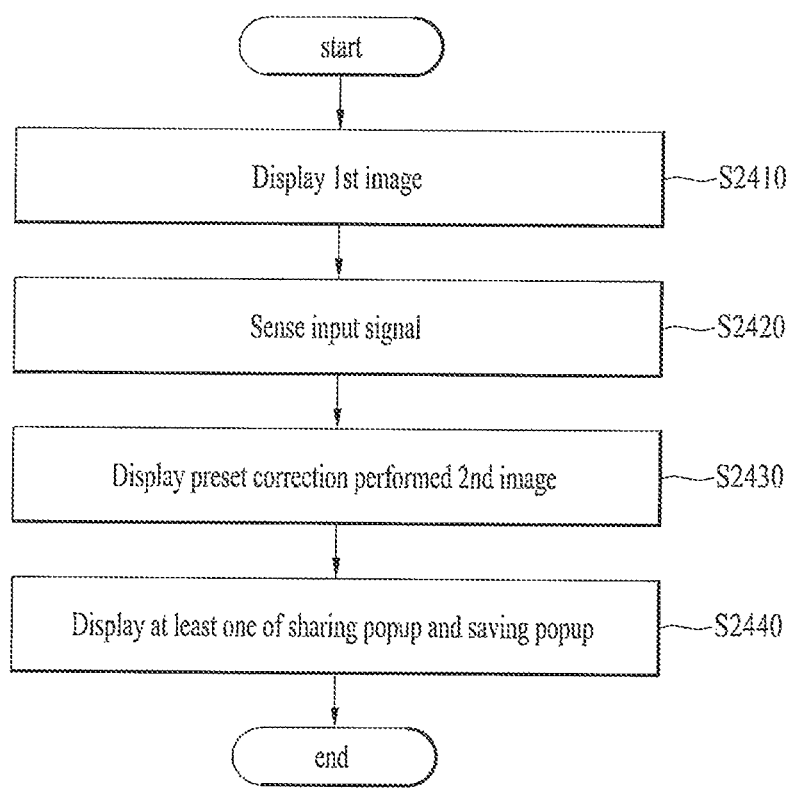
FIG. 24 is a diagram for a method of controlling a mobile terminal according to one embodiment of the present invention.

FIG. 24 is a diagram for a method of controlling a mobile terminal according to one embodiment of the present invention.

In particular, FIG. 24 shows one example of if a destabilization is not recognized from at least one object included in an image shown in FIG. 5, performing a preset correction on an image. The respective steps shown in FIG. 24 may be controlled by the controller of the mobile terminal shown in FIG. 1A. And, the substance redundant with the former substance mentioned in the description with reference to FIGS. 5 to 9 shall be omitted from the description of the embodiment with reference to FIG. 24.

Referring to FIG. 24, the mobile terminal can display a $1^{st}$ image on the display unit [S2410]. Subsequently, the mobile terminal can sense an input signal [S2420].

Subsequently, the mobile terminal can display a $2^{nd}$ image generated from performing a preset correction on the $1^{st}$ image [S2430]. This shall be described in detail with reference to FIG. 25 later.

Thereafter, the mobile terminal can display at least one of a sharing popup and a saving popup [S2440].

Figure 25:
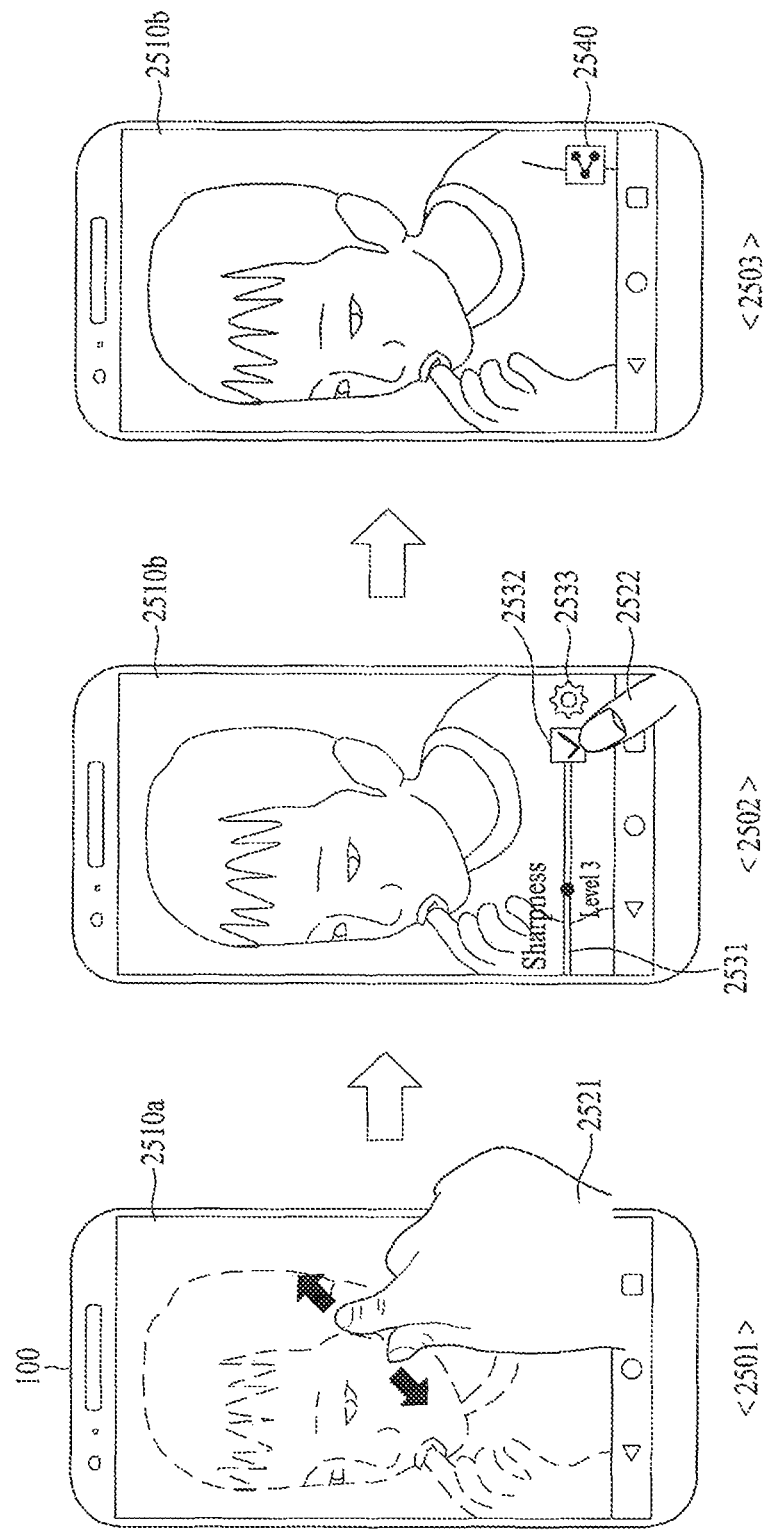
FIG. 25 is a diagram for one example of performing a preset correction on an image in a mobile terminal according to one embodiment of the present invention.

FIG. 25 is a diagram for one example of performing a preset correction on an image in a mobile terminal according to one embodiment of the present invention.

First of all, the mobile terminal can sense an input signal (not shown in the drawing) for searching for an image in a gallery application (not shown in FIG. 25). For instance, the input signal may include a flicking touch input in a left or right direction. In particular, a user can select an image to perform a preset correction thereon by searching images in a gallery.

Referring to FIG. 25 <2501>, the mobile terminal can display a $1^{st}$ image 2510a on the display unit. In this case, the $1^{st}$ image 2510a may include at least one object. And, the at least one object included in the $1^{st}$ image 2510a may correspond to a shaken state or a non-blurred state.

In doing so, while the $1^{st}$ image 2510a is displayed, the mobile terminal can sense a $1^{st}$ input signal 2521. In this case, the $1^{st}$ input signal 2521 may correspond to a signal for performing a preset correction on the $1^{st}$ image 2510a. For instance, the $1^{st}$ input signal 2521 may correspond to a pinch-out touch input or a double tap touch input. In particular, the $1^{st}$ input signal 2521 may correspond to the same input signal as described with reference to FIG. 8.

In this case, in response to the $1^{st}$ input signal, the mobile terminal can perform the preset correction on the $1^{st}$ image 2510a. In particular, the preset correction may correspond to an image editing effect automatically set in the mobile terminal or an image editing effect set by a user. According to the embodiment shown in FIG. 25, the preset correction may correspond to a sharpness correction. And, the preset correction shall be described in detail with reference to FIG. 26 later.

Hence, referring to FIG. 25 <2502>, the mobile terminal can display a $2^{nd}$ image 2510b having the preset correction performed thereon. In this case, the $2^{nd}$ image 2510b may correspond to an image clearer than the $1^{st}$ image 2510a. And, the mobile terminal can display a correction progress bar 2531, a completion icon 2532, and a setting icon 2533 on the correction performed $2^{nd}$ image 2510b.

In this case, the correction progress bar 2531 can indicate a name of a preset editing effect and a level of an editing effect. According to the embodiment shown in FIG. 25, the preset editing effect may include 'sharpness' and the rate of the editing effect may correspond to 'level 3'. It is not necessary for the correction progress bar 2531, the completion icon 2532 and the setting icon 2533, which are displayed on the $2^{nd}$ image 2510b, to be displayed together. Instead, the correction progress bar 2531, the completion icon 2532 or the setting icon 2533 may be added or deleted in part in accordance with settings. Besides, the setting icon 2533 shall be described in detail with reference to FIG. 27 later.

Subsequently, the mobile terminal can sense a $2^{nd}$ input signal 2522 for the completion icon 2532. For instance, the $2^{nd}$ input signal 2522 may correspond to a short touch input. In this case, the mobile terminal can end the preset correction performed on the $2^{nd}$ image 2510b.

Hence, referring to FIG. 25 <2503>, the mobile terminal can display a sharing popup 2540 on the $2^{nd}$ image 2510b. The sharing popup 2540 may correspond to an icon for determining whether to share the preset correction completed $2^{nd}$ image 2501b. Besides, the mobile terminal may display a saving icon (not shown in the drawing) on the $2^{nd}$ image 2510b (not shown in FIG. 25 <2503>). The sharing popup 2540 or the saving popup shall be described in detail with reference to FIGS. 33 to 36 later.

Moreover, the step <2502> may not correspond to a configuration essential to the embodiment shown in FIG. 25. In particular, in case of sensing the $1^{st}$ input signal 2521 for the $1^{st}$ image 2510a, the mobile terminal does not display the correction progress bar 2531 and the like but may be able to directly display the sharing popup 2540 or the saving popup on the $2^{nd}$ image 2510b.

FIGS. 26A, 26B and 26C are diagrams for one example of a preset correction performed on an image displayed on a mobile terminal according to one embodiment of the present invention.

First of all, as mentioned in the foregoing description with reference to FIG. 25, in case of sensing an input signal, the mobile terminal can perform a preset correction on a displayed image. In this case, the preset correction may be set based on a type of at least one object included in the image.

For instance, referring to FIG. 26A, in case that an object 2610a included in an image is a child, a preset correction may correspond to a sharpness adjustment. The reason for this is that in case of capturing the image by setting the child as a subject, the child tends to move frequently instead of being stationary. Hence, if an input signal (not shown in the drawing) is sensed, the mobile terminal is able to display a progress bar 2620a configured to adjust a sharpness of an image and to indicate a level of the sharpness.

For another instance, referring to FIG. 26B, if an object 2610b included in an image is a woman, a preset correction may correspond to a brightness adjustment. The reason for this is that one of correction effects frequently used by a female user for a captured image corresponds to an effect of brightening a face. Hence, if an input signal (not shown in the drawing) is sensed, the mobile terminal can display a progress bar 2620b configured to adjust a brightness of an image and to indicate a level of brightness.

For further instance, referring to FIG. 26C, if an object 2610c included in an image is a thing, a preset correction may correspond to a color adjustment. For instance, the color adjustment may include a switching between black and white, a change into brown color, a mosaic effect, and the like. Hence, if an input signal (not shown in the drawing) is sensed, the mobile terminal can display a progress bar 2620c indicating a color of an image.

Besides, types of a preset correction in accordance with a type of an object are non-limited by the description of the above embodiment.

Figure 27:
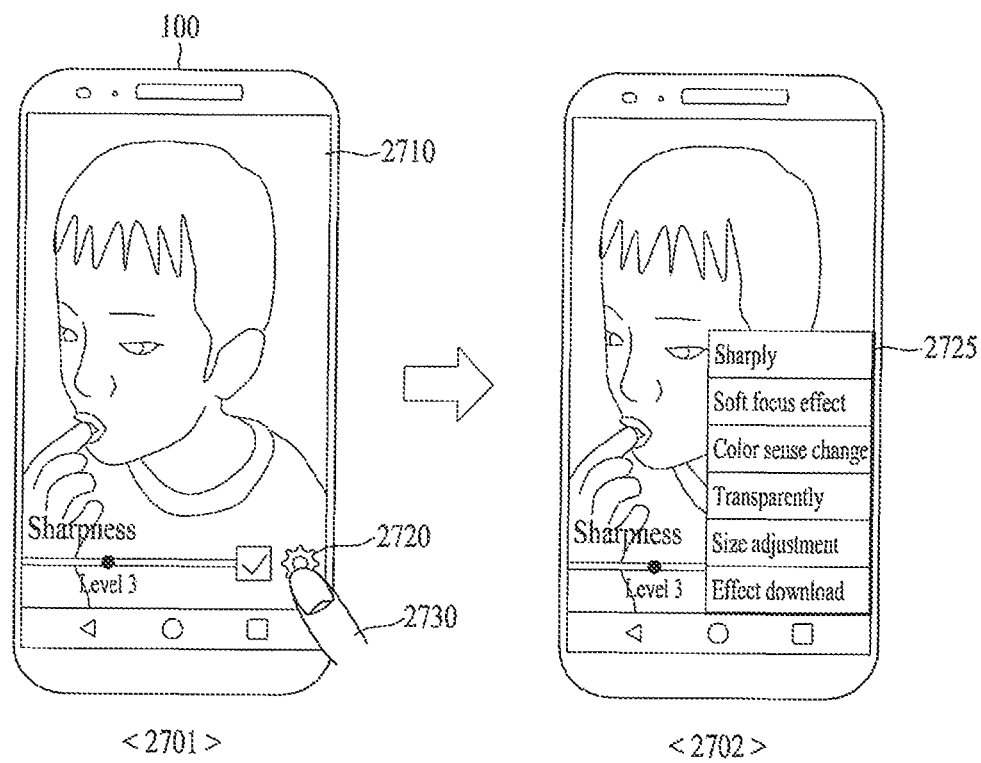
FIG. 27 is a diagram for one example of using a setting icon displayed on a mobile terminal according to one embodiment of the present invention.

FIG. 27 is a diagram for one example of using a setting icon displayed on a mobile terminal according to one embodiment of the present invention.

First of all, as mentioned in the foregoing description with reference to FIG. 25, if an input signal for an image displayed on the display unit is sensed, the mobile terminal can display an image 2710, on which a preset correction has been performed, and a setting icon 2720.

In doing so, referring to FIG. 27 <2701>, the mobile terminal can sense an input signal 2730 for the setting icon 2720. In this case, the input signal 2730 may correspond to a short touch input.

If so, referring to FIG. 27 <2702>, the mobile terminal can display a setting menu popup 2725 on the image 2710. For instance, the setting menu popup 2725 may include 'sharply', 'soft focus effect', 'color sense change', 'transparently', 'size adjustment', and 'effect download'. Hence, if an input signal (not shown in the drawing) for the setting menu popup 2725 is sensed, the mobile terminal can change a type of the preset correction. If an input signal (not shown in the drawing) for the effect download menu in the setting menu popup 2725 is sensed, the mobile terminal searches for an effect other than the correction effect appearing on the setting menu popup 2725 and is then able to download the found effect.

Figure 28:
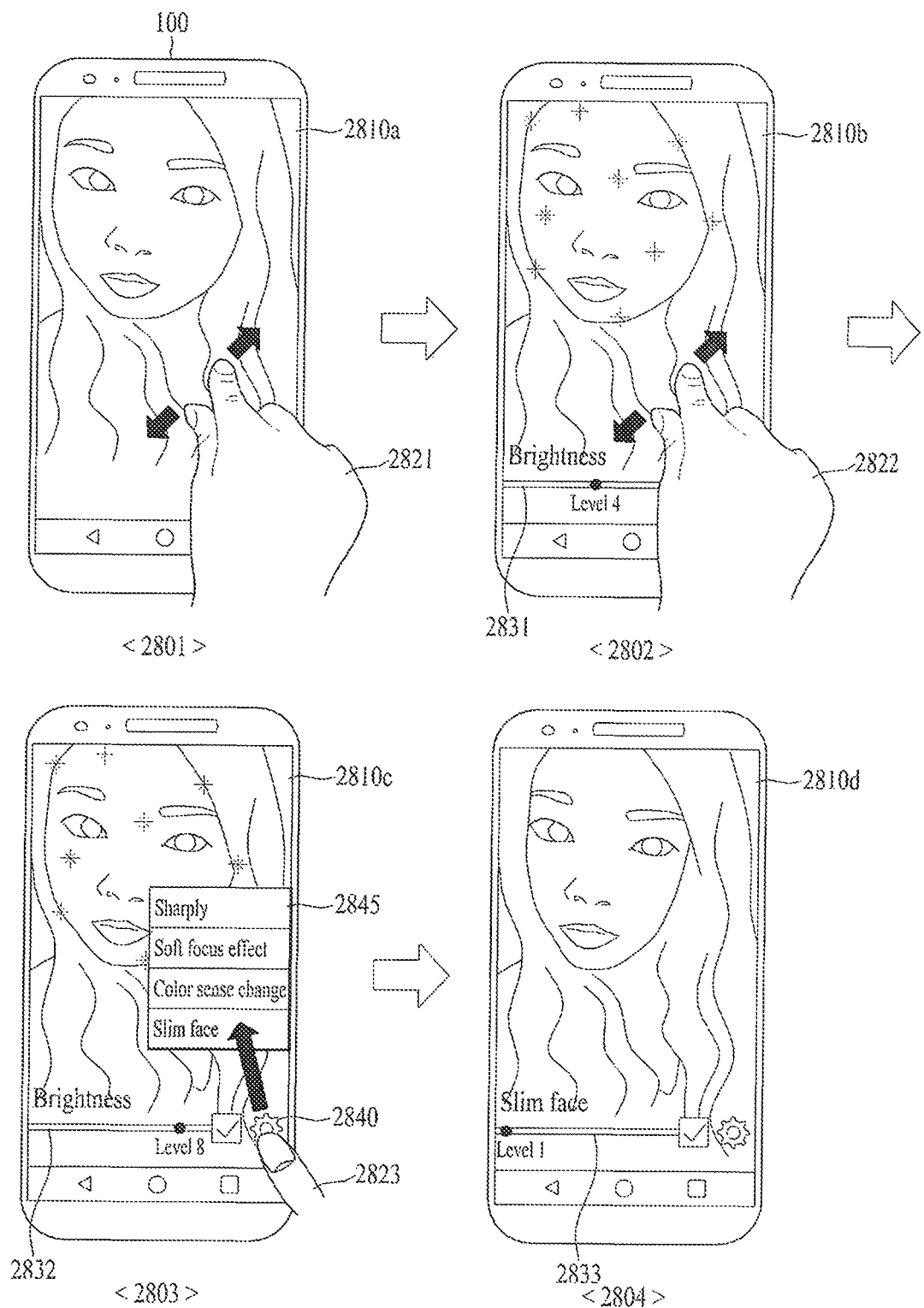
FIG. 28 is a diagram for one example of changing a type of a preset correction performed on an image displayed on a mobile terminal according to one embodiment of the present invention.

FIG. 28 is a diagram for one example of changing a type of a preset correction performed on an image displayed on a mobile terminal according to one embodiment of the present invention.

Referring to FIG. 28 <2801>, the mobile terminal can display a $1^{st}$ image 2810a on the display unit. And, assume that a destabilization of an object included in the $1^{st}$ image 2810a is not recognized. In doing so, the mobile terminal can sense a $1^{st}$ input signal 2821. In this case, the $1^{st}$ input signal 2821 may correspond to the same signal as the former $1^{st}$ input signal mentioned in the foregoing description with reference to FIG. 25.

In this case, the mobile terminal can perform a $1^{st}$ preset correction on the $1^{st}$ image 2810a. Moreover, referring to FIG. 28 <2802>, the mobile terminal can display a $2^{nd}$ image 2810b having the $1^{st}$ preset correction performed thereon. In doing so, the mobile terminal can display a correction progress bar 2831 on the $2^{nd}$ image 2810b. Brightness shown in FIG. 28 <2802> may correspond to 'level 4'.

Meanwhile, while the $2^{nd}$ image 2810b is displayed, the mobile terminal can sense a $2^{nd}$ input signal 2822. For instance, the $2^{nd}$ input signal 2822 may correspond to a pinch-out touch input or a double tab touch input. And, the $2^{nd}$ input signal 2822 may correspond to the same signal as the $1^{st}$ input signal 2821.

In this case, the mobile terminal may further perform the $1^{st}$ preset correction on the $2^{nd}$ image 2810b. Moreover, referring to FIG. 28 <2803>, the mobile terminal can display a $3^{rd}$ image 2810c having the $1^{st}$ preset correction performed additionally thereon. In doing so, the brightness of a correction progress bar 2832 displayed on the $3^{rd}$ image 2810c may correspond to 'level 8'.

In this case, the mobile terminal can sense a $3^{rd}$ input signal 2823 for a setting icon 2840. For instance, the $3^{rd}$ input signal 2823 may correspond to a drag touch input. And, the $3^{rd}$ input signal 2823 may include a start point and an end point. For instance, if the start point of the $3^{rd}$ input signal 2823 is sensed from the setting icon 2840, the mobile terminal can display a setting menu popup 2845 on the display unit. In this case, the $3^{rd}$ input signal 2823 may start from the setting icon 2840 and may end to 'slim face' in the setting menu popup 2845.

If so, the mobile terminal ends the $1^{st}$ preset correction on the $3^{rd}$ image 2810c and is able to perform a $2^{nd}$ preset correction. For instance, according to the embodiment shown in FIG. 28, the mobile terminal can perform the $2^{nd}$ preset correction on the $3^{rd}$ image 2810c by changing the preset correction effect into 'slim face' from 'brightness adjustment'. Hence, referring to FIG. 28 <2804>, the mobile terminal can display a $4^{th}$ image 2810d having the $2^{nd}$ preset correction performed thereon. In doing so, a correction progress bar 2833 displayed on the $4^{th}$ image 2810d may include a level of 'slim face', for example, 'level 1'.

Meanwhile, according to the above-described embodiment, the $1^{st}$ preset correction and the $2^{nd}$ preset correction are non-limited but may correspond to various correction effects. Besides, if a pinch-out touch input is additionally sensed in FIG. 28 <2803>, the mobile terminal can display an image generated from additionally performing a brightness adjustment on the $3^{rd}$ image 2810c (not shown in FIG. 28).

In case that a plurality of objects are included in an image, FIGS. 29 to 32 show embodiments for performing a different correction on each of the objects in response to an input signal. Although the aforementioned correction progress bar, completion icon and setting icon are not shown in FIGS. 29 to 32, they are assumed as shown in FIGS. 29 to 32. According to the embodiments shown in FIGS. 29 to 32, if an input signal is sensed, the mobile terminal may perform a different preset correction on each of a plurality of the objects.

Figure 29:
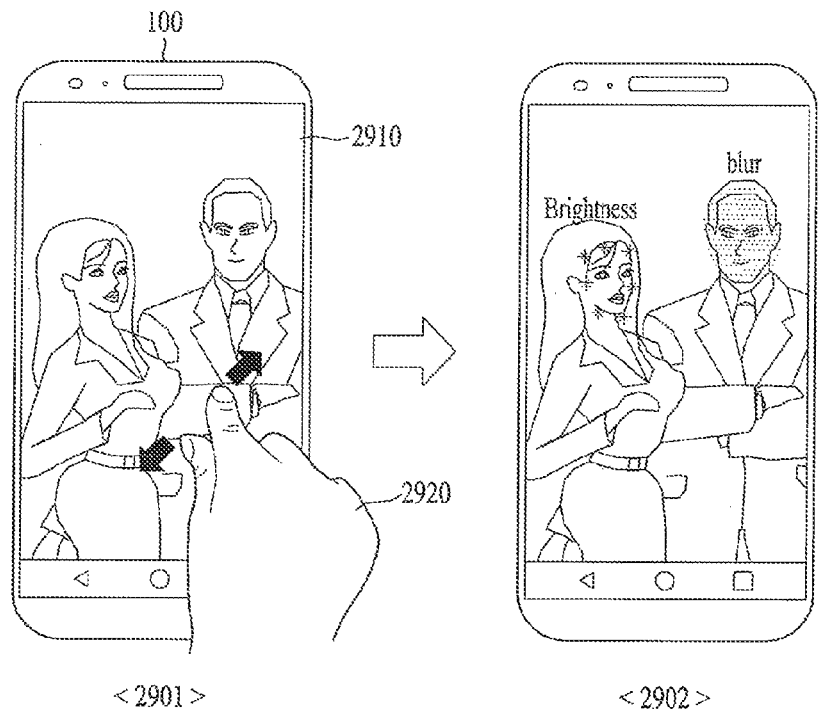
FIG. 29 is a diagram for one example of performing a preset correction on a plurality of objects contained in an image in a mobile terminal according to one embodiment of the present invention.

FIG. 29 is a diagram for one example of performing a preset correction on a plurality of objects contained in an image in a mobile terminal according to one embodiment of the present invention.

Referring to FIG. 29 <2901>, the mobile terminal can display an image 2910 including a plurality of objects. For instance, a plurality of the objects may correspond to a female and a male. In doing so, the mobile terminal can sense an input signal 2920. In this case, the input signal 2920 may correspond to the same signal as the $1^{st}$ input signal mentioned in the foregoing description with reference to FIG. 25.

If so, the mobile terminal can perform a preset correction on each of a plurality of the objects included in the image 2910. For instance, the preset correction on the female object may correspond to a correction for raising a brightness, while the preset correction on the male object may correspond to a correction for lowering a sharpness. Hence, referring to FIG. 29 <2902>, the mobile terminal can display an image including a plurality of the preset correction performed objects.

Besides, a user may desire to perform a preset correction on one of a plurality of objects included in an image only (not shown in FIG. 29). For instance, if a double tap touch input and a long touch input are consecutively sensed from a position corresponding to a single object, the mobile terminal may perform a preset correction on the single object, from which an input signal is sensed, only. For another instance, if a signal of tilting the mobile terminal is sensed, the mobile terminal selects an object included in an image based on a tilted direction and may then perform a preset correction on the selected object.

Figure 30:
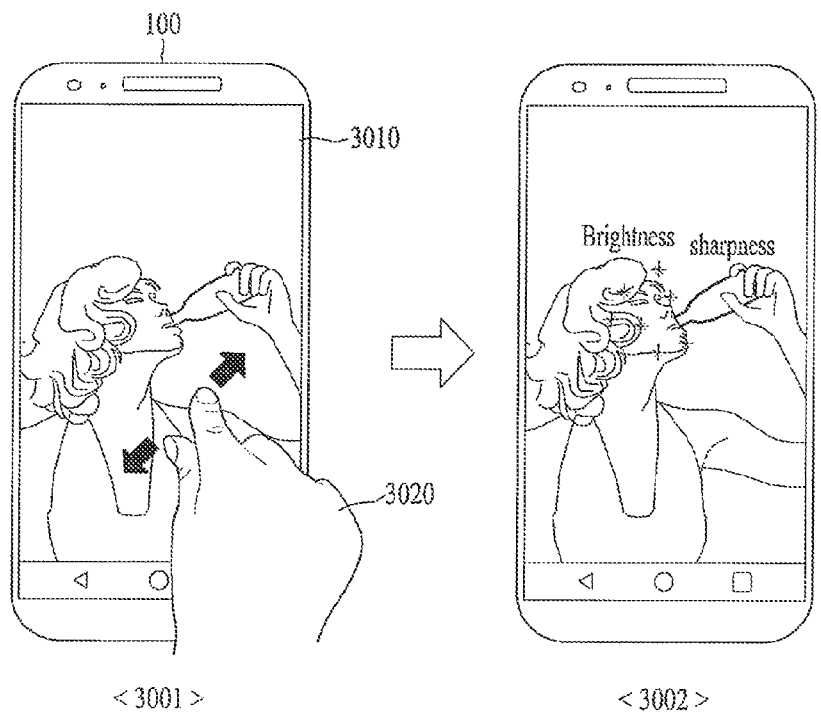
FIG. 30 is a diagram for one example of performing a preset correction on a plurality of objects contained in an image in a mobile terminal according to one embodiment of the present invention.

FIG. 30 is a diagram for one example of performing a preset correction on a plurality of objects contained in an image in a mobile terminal according to one embodiment of the present invention.

Referring to FIG. 30 <3001>, the mobile terminal can display an image 3010 including a person object and a thing object. In doing so, the mobile terminal can sense an input signal 3020. In this case, the input signal 3020 may correspond to the same signal as the $1^{st}$ input signal mentioned in the foregoing description with reference to FIG. 25.

If so, the mobile terminal can perform a preset correction on each of a plurality of the objects included in the image 3010. For instance, according to the embodiment shown in FIG. 30, the mobile terminal prioritizes a plurality of the objects, raises a brightness of an object having a higher priority, and lowers a sharpness of an object having a lower priority. Thus, the mobile terminal can perform a correction in a manner that the object having the higher priority can be viewed more vividly. If a thing object and a person object are simultaneously included, the mobile terminal may highly prioritize the person object.

Hence, referring to FIG. 30 <3002>, the mobile terminal can display an image on which a correction is performed in a manner of raising a brightness of the person object and further blurring the thing object.

Figure 31:
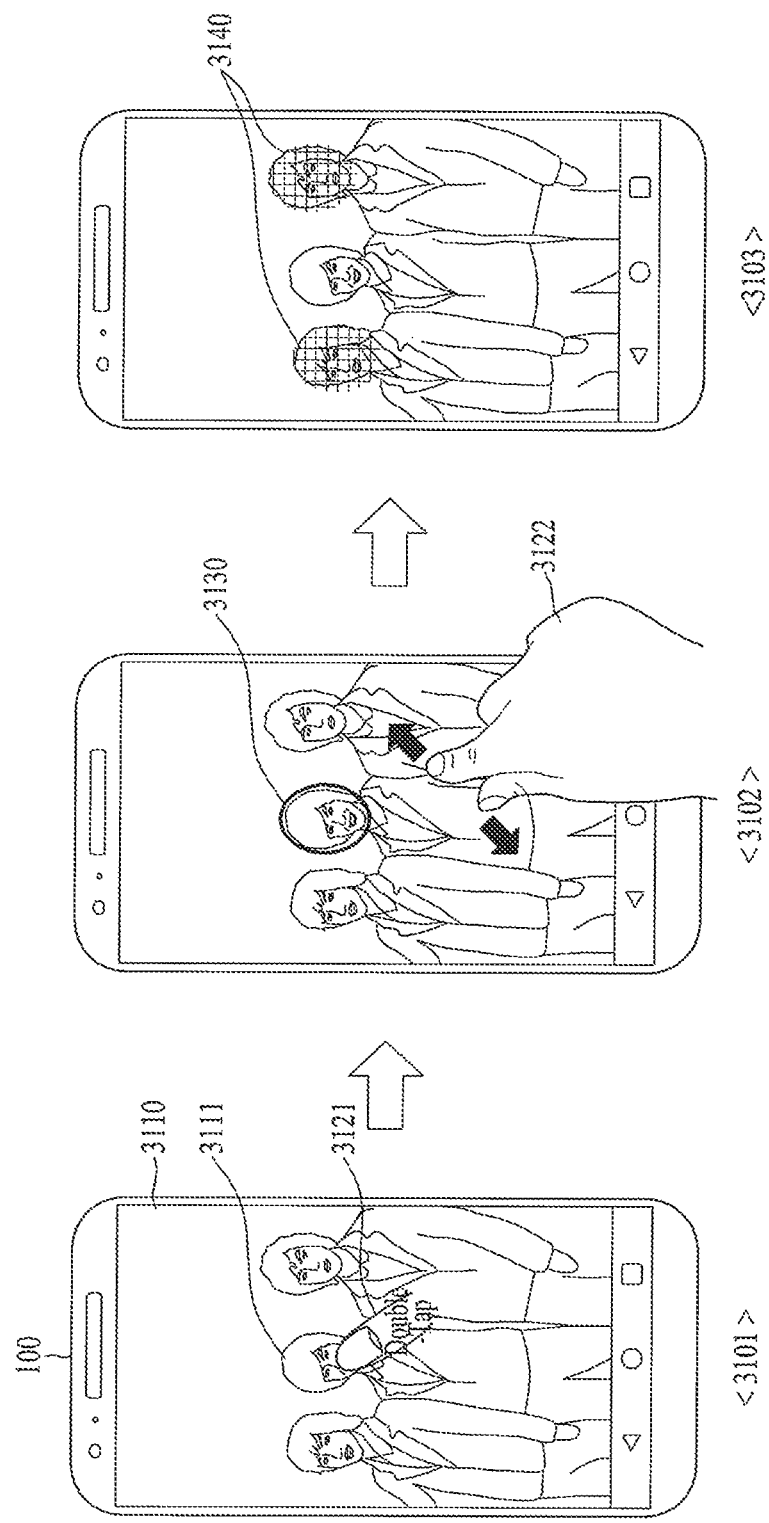
FIG. 31 is a diagram for one example of performing a preset correction on a plurality of objects contained in an image in a mobile terminal according to one embodiment of the present invention.

FIG. 31 is a diagram for one example of performing a preset correction on a plurality of objects contained in an image in a mobile terminal according to one embodiment of the present invention.

Referring to FIG. 31 <3101>, the mobile terminal can display an image 3110 including a plurality of person objects. In doing so, the mobile terminal can sense a $1^{st}$ input signal 3121. In this case, the $1^{st}$ input signal 3121 may correspond to a signal for selecting a $1^{st}$ person 3111. For instance, the $1^{st}$ input signal 3121 may correspond to a double tap touch input, a long touch input, or the like.

If so, referring to FIG. 31 <3102>, the mobile terminal can display an indicator 3130 indicating that the $1^{st}$ person 3111 has been selected from a plurality of the person objects. And, the mobile terminal can sense a $2^{nd}$ input signal 3122. In this case, the $2^{nd}$ input signal 3122 may correspond to the same input as the former $1^{st}$ input signal described with reference to FIG. 25.

In response to the $2^{nd}$ input signal 3122, the mobile terminal can perform a preset correction. In particular, the mobile terminal can perform the preset correction on the rest of the objects except the selected $1^{st}$ person 3111. According to the embodiment shown in FIG. 31, the preset correction may correspond to a mosaic effect. Hence, referring to FIG. 31 <3103>, the mobile terminal can display an image generated from performing a mosaic effect correction on the rest of the persons 3140 except the $1^{st}$ person 3111.

Besides, according to the embodiment shown in FIG. 31, if the mobile terminal senses a $2^{nd}$ input signal directly without sensing a $1^{st}$ input signal for a specific person, the mobile terminal may perform a mosaic effect correction on all objects included in an image. According to the embodiment shown in FIG. 31, if the mobile terminal senses a $3^{rd}$ input signal (not shown in the drawing) for an object having a mosaic effect correction performed thereon, the mobile terminal may adjust a level of the mosaic effect correction. For instance, the $3^{rd}$ input signal may correspond to a drag touch input.

Figure 32:
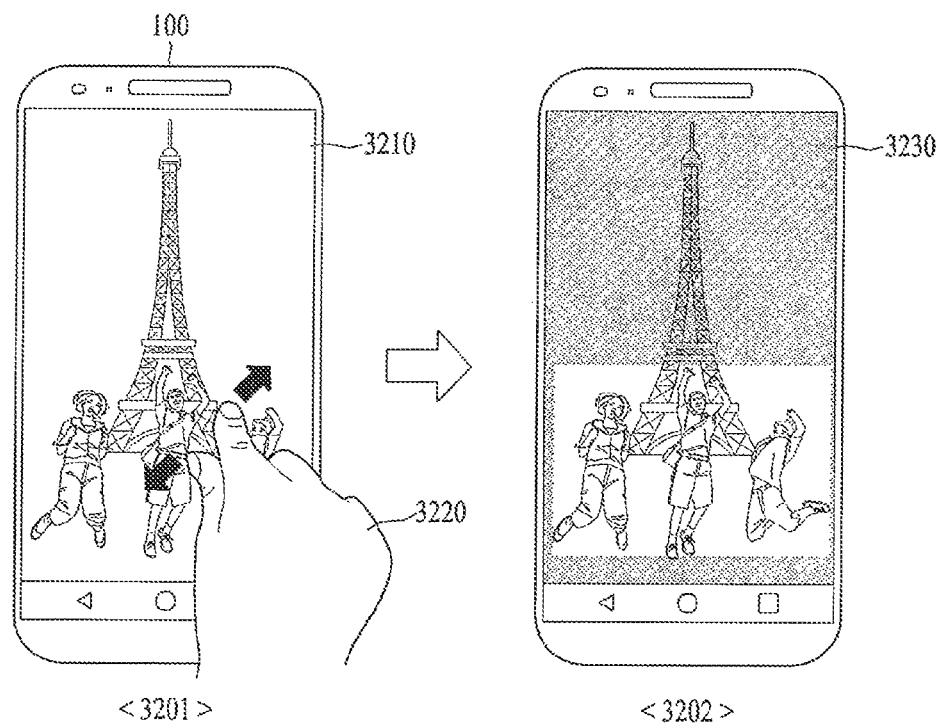
FIG. 32 is a diagram for one example of performing a preset correction on a plurality of objects contained in an image in a mobile terminal according to one embodiment of the present invention.

FIG. 32 is a diagram for one example of performing a preset correction on a plurality of objects contained in an image in a mobile terminal according to one embodiment of the present invention.

Referring to FIG. 32 <3201>, the mobile terminal can display an image 3210 including a plurality of objects. In this case, a plurality of the objects may include a person and a thing. In doing so, the mobile terminal can sense an input signal 3220. In this case, the input signal 3220 may correspond to the same signal as the $1^{st}$ input signal mentioned in the foregoing description with reference to FIG. 25.

If so, the mobile terminal can perform a correction for lowering a brightness of a rest region 3230 except the person object among a plurality of objects included in the image 3210. Hence, referring to FIG. 32 <3202>, the mobile terminal can display an image corrected in a manner of darkening the rest region 3230 except the person object.

Besides, the mobile terminal may sense an additional gesture signal (not shown in the drawing) (not shown in FIG. 32). For instance, the additional gesture signal (not shown in the drawing) may correspond to a gesture of shaking the mobile terminal right and left (or, from side to side). If so, the mobile terminal can display an image having the preset correction inverted in the above-described embodiment shown in FIG. 32.

FIGS. 33A to 36 show a method of saving or sharing a destabilization or preset correction completed image mentioned in the foregoing description.

Figure 33A:
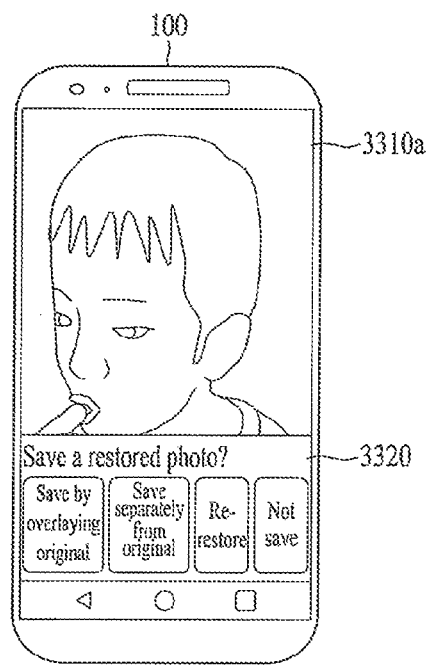
FIGS. 33A and 33B are diagrams for one example of saving or sharing a correction completed image in a mobile terminal according to one embodiment of the present invention.
Figure 33B:
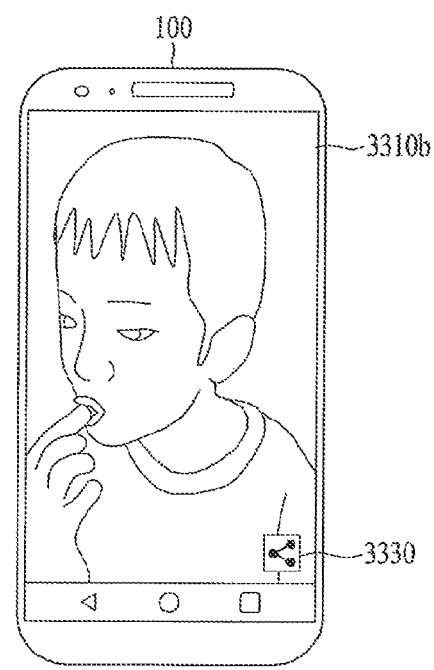

FIGS. 33A and 33B are diagrams for one example of saving or sharing a correction completed image in a mobile terminal according to one embodiment of the present invention.

First of all, according to the present invention, in case of performing a destabilization correction or a preset correction on an image, the mobile terminal can display at least one of a saving popup and a sharing popup on the display unit.

For instance, referring to FIG. 33A, the mobile terminal can display a saving popup 3320 on a corrected image 3310a. The saving popup 3320 may include a plurality of selectable menus. In this case, the saving popup 3320 may include a menu for saving by overlaying an original image, a menu for saving separately from an original image, a menu for restoring a corrected image, and a menu for not saving a corrected image.

For instance, the menu for saving by overlaying an original image may correspond to a menu for saving to the same location at which an original image is saved in a gallery application of the mobile terminal. For instance, the menu for saving separately from an original image may correspond to a menu for saving to a location next to a location at which an original image is saved in a gallery application of the mobile terminal. For instance, the menu for restoring a corrected image may correspond to a menu for re-executing from a first step of restoration. For instance, the menu for not saving a corrected image may correspond to a menu for removing the saving popup 3320 from the display unit.

For another instance, referring to FIG. 33B, the mobile terminal can display a sharing popup 3330 on a corrected image 3310b. Besides, if an input signal (not shown in the drawing) for the sharing popup 3330 is sensed, various application menus for the image sharing may be displayed (not shown in FIG. 33B).

Figure 34:
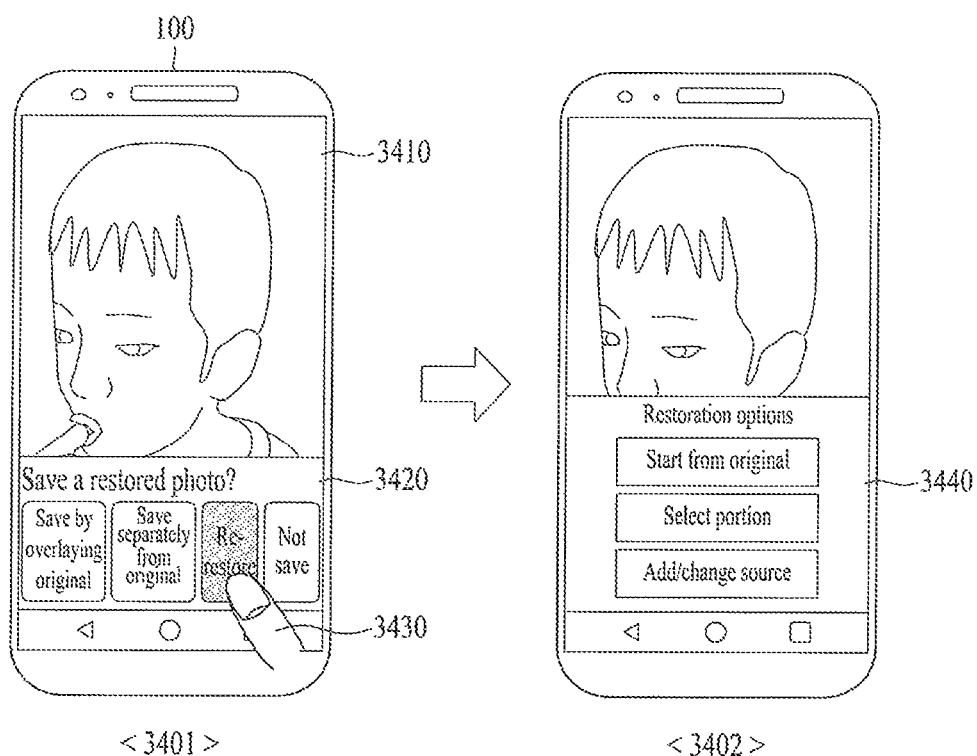
FIG. 34 is a diagram for one example of re-correcting a correction completed image in a mobile terminal according to one embodiment of the present invention.

FIG. 34 is a diagram for one example of re-correcting a correction completed image in a mobile terminal according to one embodiment of the present invention.

First of all, as mentioned in the foregoing description with reference to FIG. 33A, the mobile terminal can display a saving popup 3420 on a corrected image 3410. Referring to FIG. 34 <3401>, the mobile terminal can sense an input signal 3430 for a re-restoration menu in the saving popup 3420. For instance, the input signal may correspond to a short touch input.

If so, referring to FIG. 34 <3402>, the mobile terminal can display a re-restoration menu 3440 on the image 3410. In this case, the re-restoration menu 3440 can include a menu for starting a correction from an original image again, a menu for performing a correction by selecting a portion of an image, and a menu for adding or changing a source image used for an image correction. The re-restoration menu 3440 is non-limited by the above-mentioned menus but may include various menus.

Figure 35:
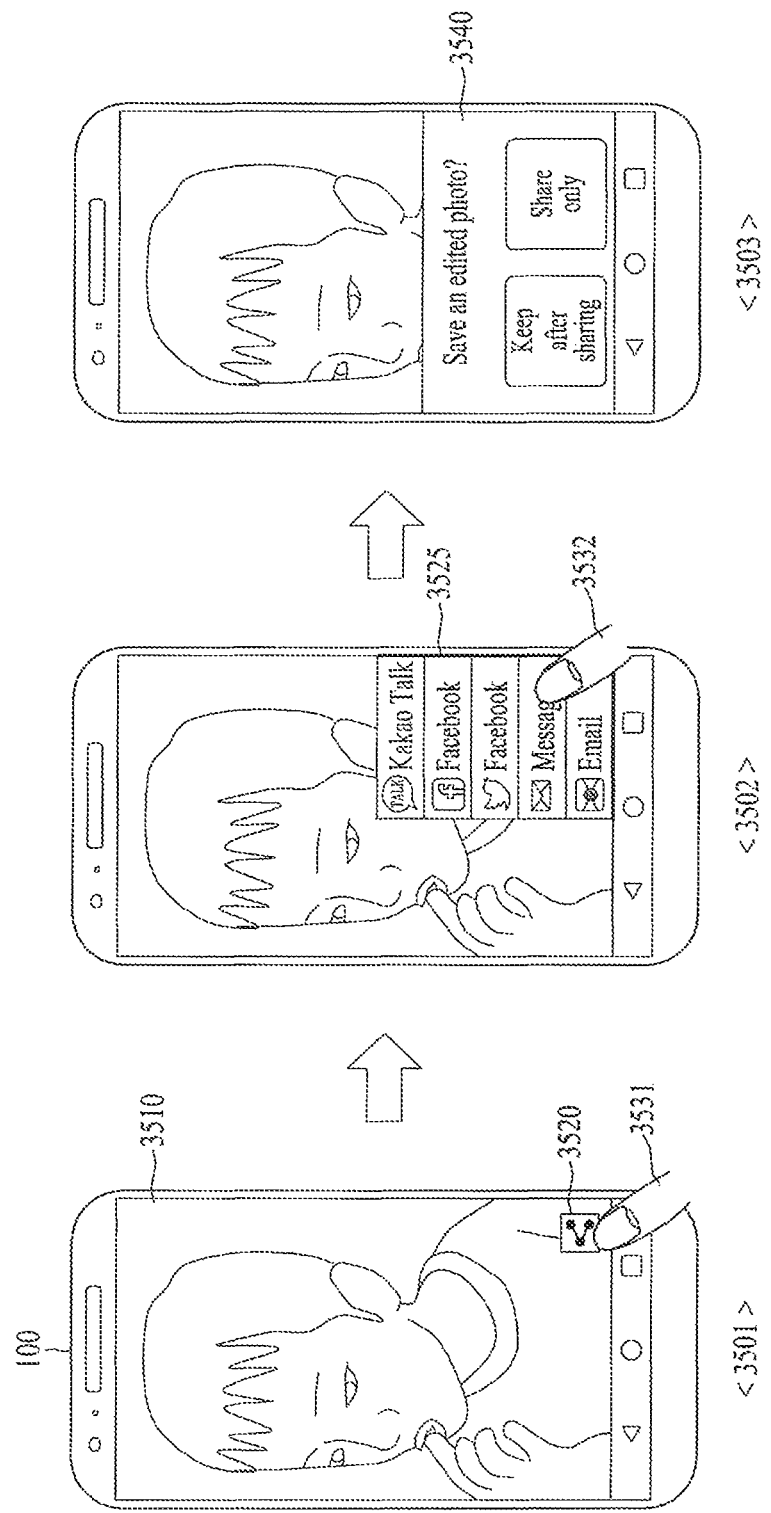
FIG. 35 is a diagram for one example of providing a sharing popup and a saving popup for a correction completed image in a mobile terminal according to one embodiment of the present invention.

FIG. 35 is a diagram for one example of providing a sharing popup and a saving popup for a correction completed image in a mobile terminal according to one embodiment of the present invention.

In particular, FIG. 35 shows a method of determining whether to additionally save a corrected image before running an application for sharing the corrected image. And, the substance redundant with the former substance mentioned in the description with reference to FIG. 33 shall be omitted from the following description with reference to FIG. 35.

Referring to FIG. 35 <3501>, as mentioned in the foregoing description with reference to FIG. 33B, the mobile terminal can display a sharing popup 3520 on a corrected image 3510. And, the mobile terminal can sense a $1^{st}$ input signal 3531 for the sharing popup 3520. If so, referring to FIG. 35 <3502>, the mobile terminal can display a menu of various applications for sharing images.

The mobile terminal can sense a $2^{nd}$ input signal 3532 for the sharing menu. For instance, the $2^{nd}$ input signal 3532 may correspond to a short touch input. If so, the mobile terminal can set or determine to share the image 3510 with an external device through 'message application'. Referring to FIG. 35 <3503>, the mobile terminal can display a popup 3540 for determining whether to save the image 3510. In this case, the popup 3540 for determining whether to save the image 3510 may include a menu for keeping after sharing and a menu for sharing only.

For instance, the menu for keeping after sharing may correspond to a menu for sharing a corrected image and saving the corrected image to a position next to that of an original image in a gallery application. For instance, the menu for sharing only may correspond to a menu for sharing a corrected image and then deleting the corrected image from a memory automatically. Yet, in doing so, after the corrected image has been temporarily saved to a buffer for correction and sharing, if the sharing is completed, the corrected image can be deleted.

Figure 36:
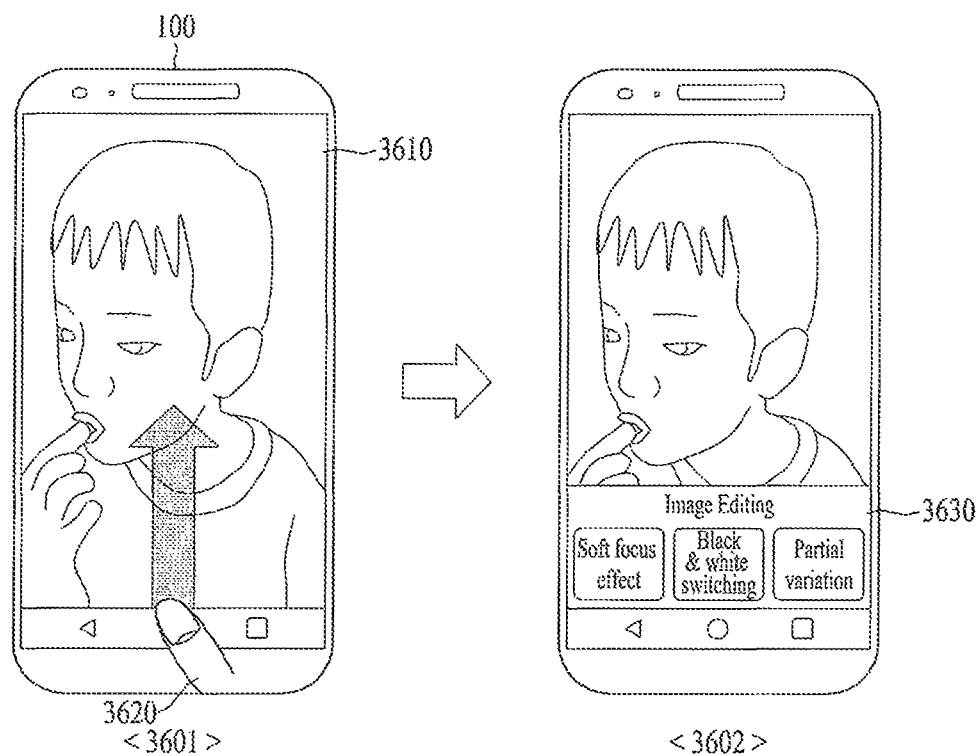
FIG. 36 is a diagram for one example of performing an additional correction on a destabilization correction completed image in a mobile terminal according to one embodiment of the present invention.

FIG. 36 is a diagram for one example of performing an additional correction on a destabilization correction completed image in a mobile terminal according to one embodiment of the present invention.

Referring to FIG. 36 <3601>, the mobile terminal can sense an input signal 3620 while a corrected image 3610 is displayed. In this case, the input signal 3620 may correspond to a signal for performing an additional correction on a destabilization correction completed image.

For instance, as shown in FIG. 36 <3601>, the input signal 3620 may correspond to a drag touch of moving from a bottom side to a top side or a flicking touch input. For another instance, the input signal 3620 may correspond to a signal of shaking the mobile terminal right and left (or, from side to side) in a state of tilting a top end of the mobile terminal in a direction getting closer to a user (not shown in FIG. 36). In this case, if the mobile terminal is shaken at least twice right and left, the mobile terminal may determine that the input signal is received, by which the present invention is non-limited. For further instance, the input signal 3620 may correspond to a signal of shaking the mobile terminal right and left in a state of maintaining a touch input to the display unit (not shown in FIG. 36). The input signal 3620 is non-limited by the above description. And, the input signal 3620 may be implemented into other input signals in a manner of combining at least two embodiments together.

If so, referring to FIG. 36 <3602>, the mobile terminal can display a popup 3630 for an additional correction. In this case, the popup 3630 for the additional correction may include other correction effects as well as the destabilization correction. Hence, a user can perform other corrections on a destabilization correction completed image conveniently and easily.

Various embodiments may be implemented using a machine-readable medium having instructions stored thereon for execution by a processor to perform various methods presented herein. Examples of possible machine-readable mediums include HDD(Hard Disk Drive), SSD (Solid State Disk), SDD(Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
 a display; and
 a controller operably coupled to the display and configured to:
  cause the display to display a first image;
  cause the display to display a second image when destabilization of at least one object included in the first image is detected, the second image being an image of which destabilization correction is performed on the at least one object; and
  cause the display to display a third image when no destabilization of the at least one object is detected in the first image, the third image being an image of which preset correction is performed on the first image.

2. The mobile terminal of claim 1, wherein the controller is further configured to cause the display to display at least one of a saving popup or a sharing popup after completing either the destabilization correction or the preset correction.

3. The mobile terminal of claim 2, wherein the controller is further configured to:
 recognize a first input received while the first image is displayed when the destabilization of the at least one object included in the first image is detected; and
 cause the display to display a source image list including at least one source image in response to the first input.

4. The mobile terminal of claim 3, wherein the controller is further configured to provide an additional source image other than the at least one source image included in the source image list in response to a second input received while the source image list is displayed.

5. The mobile terminal of claim 3, wherein:
 the at least one source image is determined based on similarity with the first image; and
 the similarity with the first image is determined based on one selected from the group consisting of similarity with the at least one object, similarity with a composition of the first image, and similarity with a capture timing point of the first image.

6. The mobile terminal of claim 3, wherein the controller is further configured to:
 recognize a second input received while the source image list is displayed; and
 perform the destabilization correction of the at least one object based on a source image selected from the source image list by the second input.

7. The mobile terminal of claim 6, further comprising a sensing unit including an image sensor and a distance sensor, wherein the controller is further configured to:
 correct a lens distortion of the first image based on data sensed via at least one of the image sensor or the distance sensor;
 extract a feature point from the first image;
 select the source image including the extracted feature point; and
 perform a first three-dimensional (3D) restoration of the at least one object included in the first image.

8. The mobile terminal of claim 7, wherein:
 the controller is further configured to perform a second 3D restoration on the first image in response to a third input received after the first 3D restoration has been performed on the first image; and
 the second 3D restoration is denser than the first 3D restoration.

9. The mobile terminal of claim 1, wherein the controller is further configured to:
 increase sharpness of the destabilization correction in response to a first input received via the second image; and
 decrease the sharpness of the destabilization correction in response to a second input signal received via the second image.

10. The mobile terminal of claim 1, wherein the controller is further configured to cause the display to display a popup menu inquiring whether to perform the preset correction on the first image after completing the destabilization correction of the first image.

11. The mobile terminal of claim 1, wherein the first image corresponds to a thumbnail list including a plurality of thumbnail images.

12. The mobile terminal of claim 11, wherein the controller is further configured to:
enter an editing mode of the thumbnail list in response to a user input received while the thumbnail list is displayed; and
cause the display to display a destabilization indicator with respect to at least one of the plurality of the thumbnail images in the editing mode, and
wherein the destabilization indicator indicates that destabilization is detected from the at least one of the plurality of the thumbnail images.

13. The mobile terminal of claim 12, wherein the controller is further configured to:
perform destabilization correction on a real image corresponding to a thumbnail image in response to an input received via the thumbnail image included in the thumbnail list, the input received in the editing mode; and
cause the display to display an updated thumbnail image in the thumbnail list, the update thumbnail image corresponding to the thumbnail image on which the destabilization correction has been performed.

14. The mobile terminal of claim 12, wherein the controller is further configured to delete the at least one of the plurality of thumbnail images displayed with the destabilization indicator from the thumbnail list in response to an input received while the destabilization indicator is displayed.

15. The mobile terminal of claim 1, wherein the controller is further configured to cause the display to display at least one selected from the group consisting of a correction progress bar, a completion icon, and a setting icon on the displayed third image.

16. The mobile terminal of claim 15, wherein the controller is further configured to cause the display to display a fourth image having an additional preset correction performed thereon in response to an input received while the third image is displayed.

17. The mobile terminal of claim 15, wherein the controller is further configured to cause the display to display at least one of a sharing popup or a saving popup in response to an input received via the completion icon.

18. The mobile terminal of claim 1, wherein the preset correction comprises a correction effect set based on a type of the at least one object included in the first image.

19. The mobile terminal of claim 1, further comprising a memory, wherein the controller is further configured to cause the memory to store the second image and the third image to a location that is different from a location in which the first image is stored.

20. A method for controlling a mobile terminal, comprising:
displaying a first image on a display;
displaying a second image when destabilization of at least one object included in the first image is detected, the second image being an image of which destabilization correction is performed on the at least one object; and
displaying a third image when no destabilization of the at least one object is detected in the first image, the third image being an image of which a preset correction is performed on the first image.

* * * * *